Figure 1:
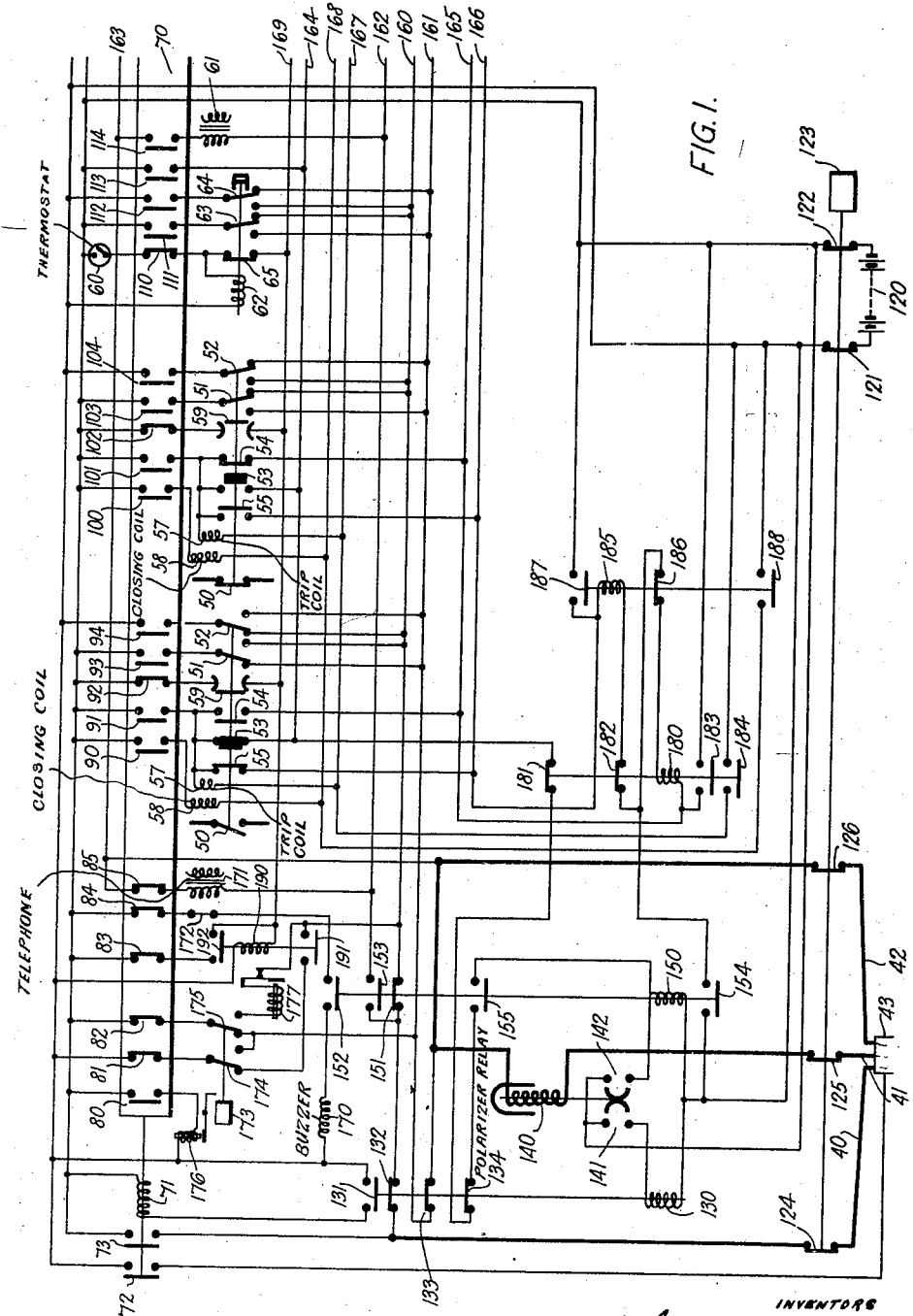

Aug. 25, 1931.  B. H. LEESON ET AL  1,820,354

ELECTRICAL REMOTE CONTROL SYSTEM

Filed Nov. 12, 1928  20 Sheets-Sheet 1

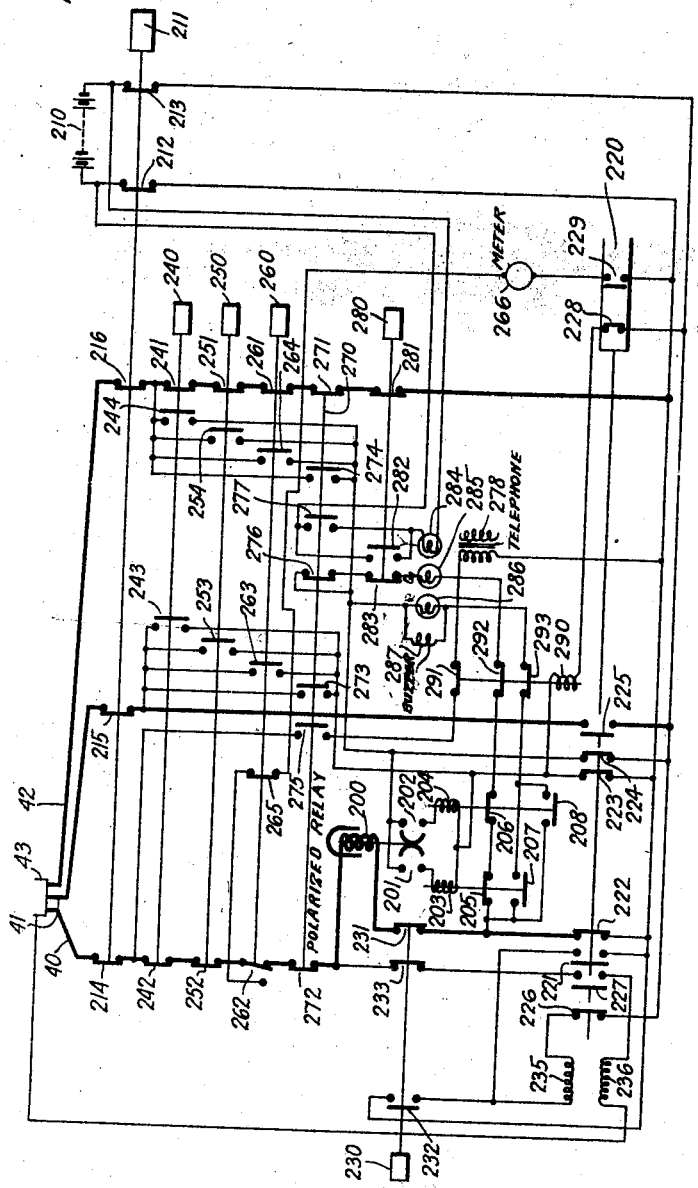

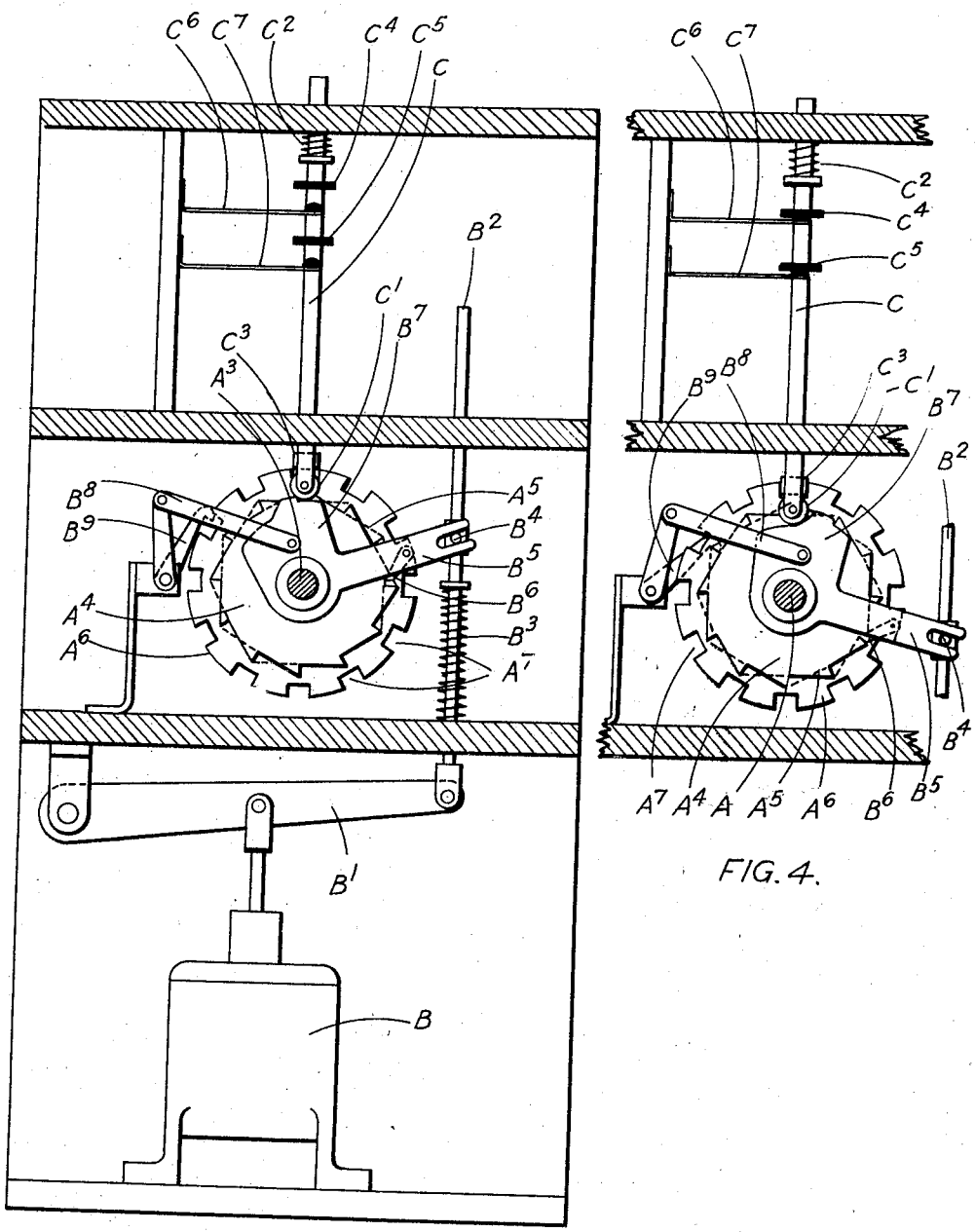

Aug. 25, 1931.  B. H. LEESON ET AL  1,820,354

ELECTRICAL REMOTE CONTROL SYSTEM

Filed Nov. 12, 1928  20 Sheets—Sheet 5

INVENTORS
B. H. Leeson & O. C. F. King
Watson, Coit, Morse & Grindle
ATTYS

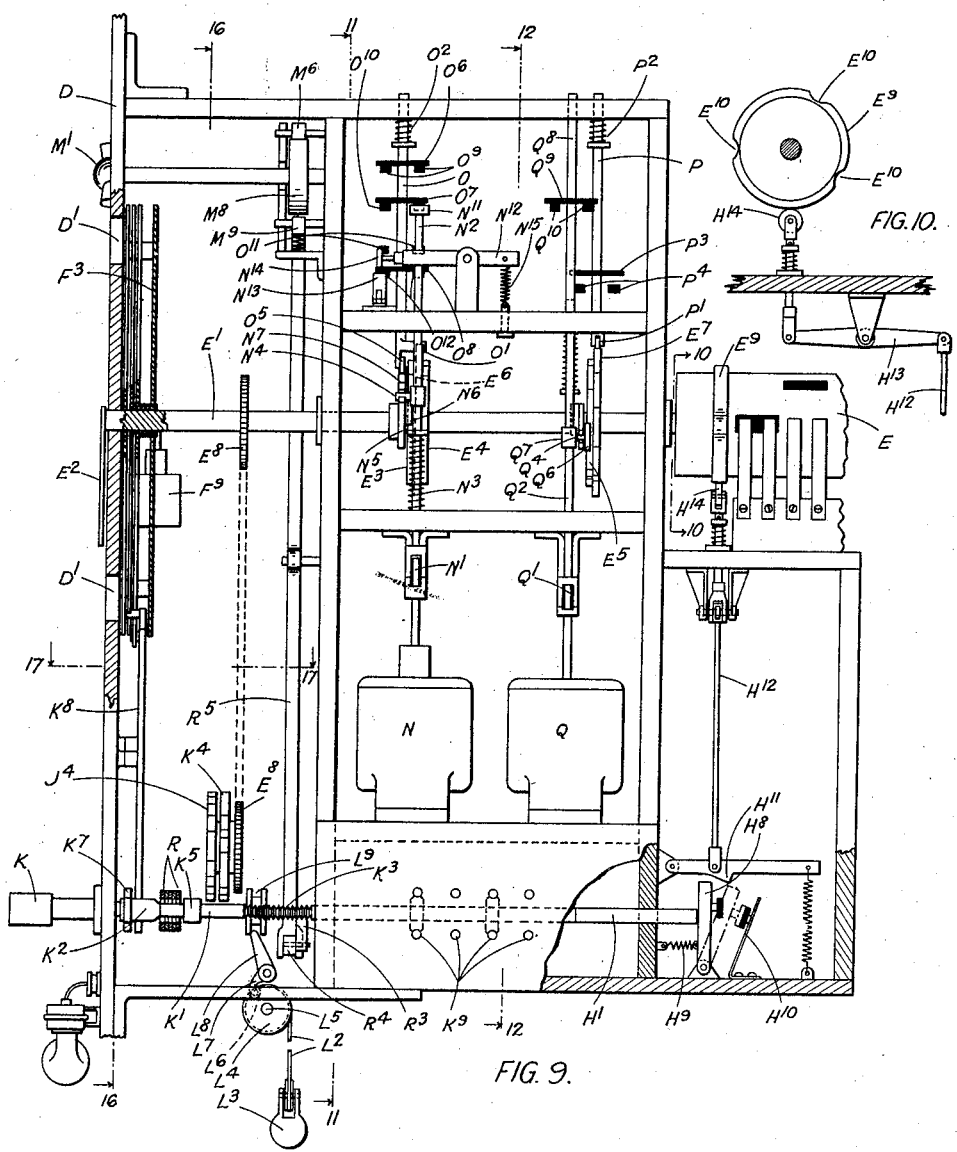

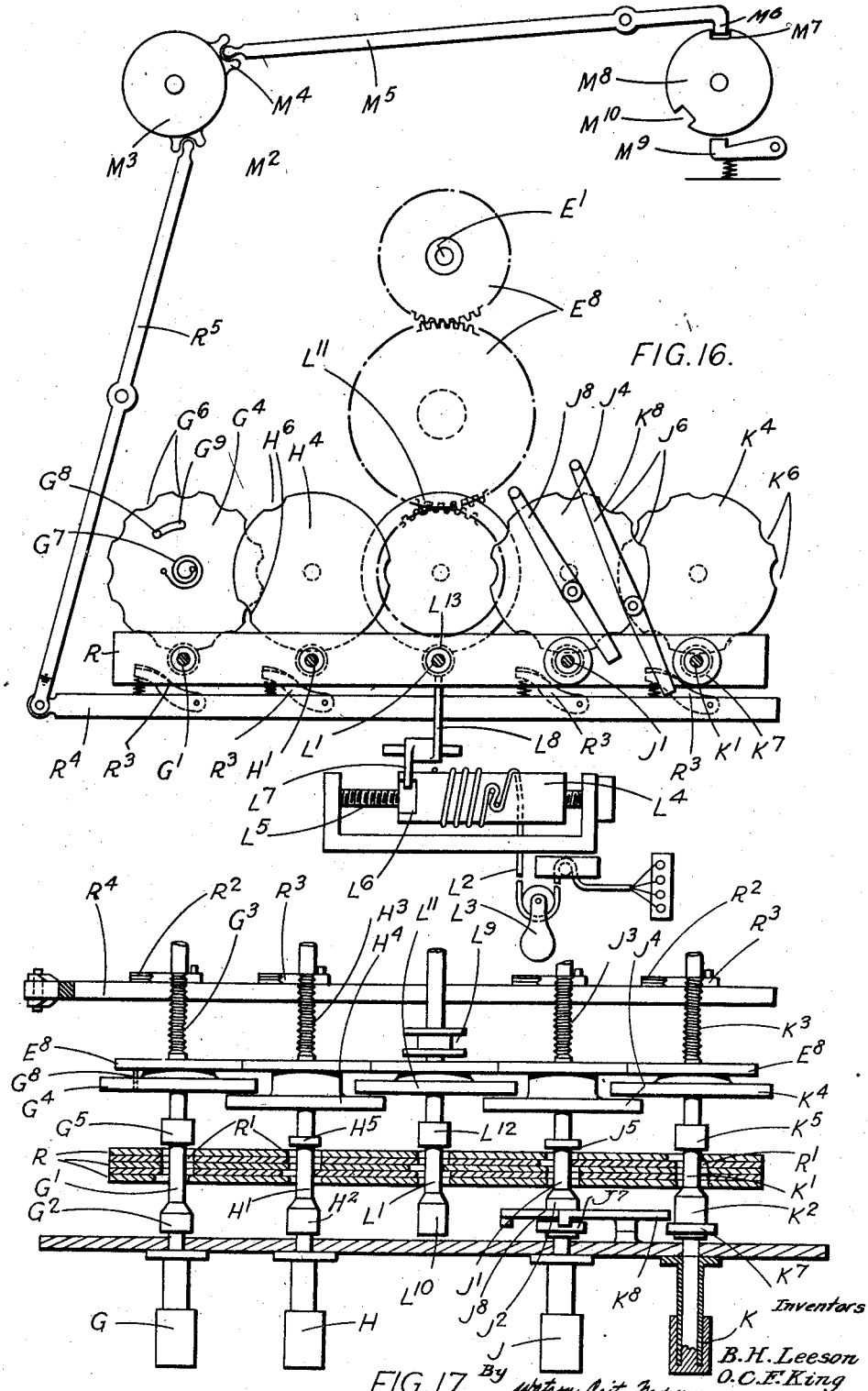

Aug. 25, 1931.　　B. H. LEESON ET AL　　1,820,354
ELECTRICAL REMOTE CONTROL SYSTEM
Filed Nov. 12, 1928　　20 Sheets-Sheet 13
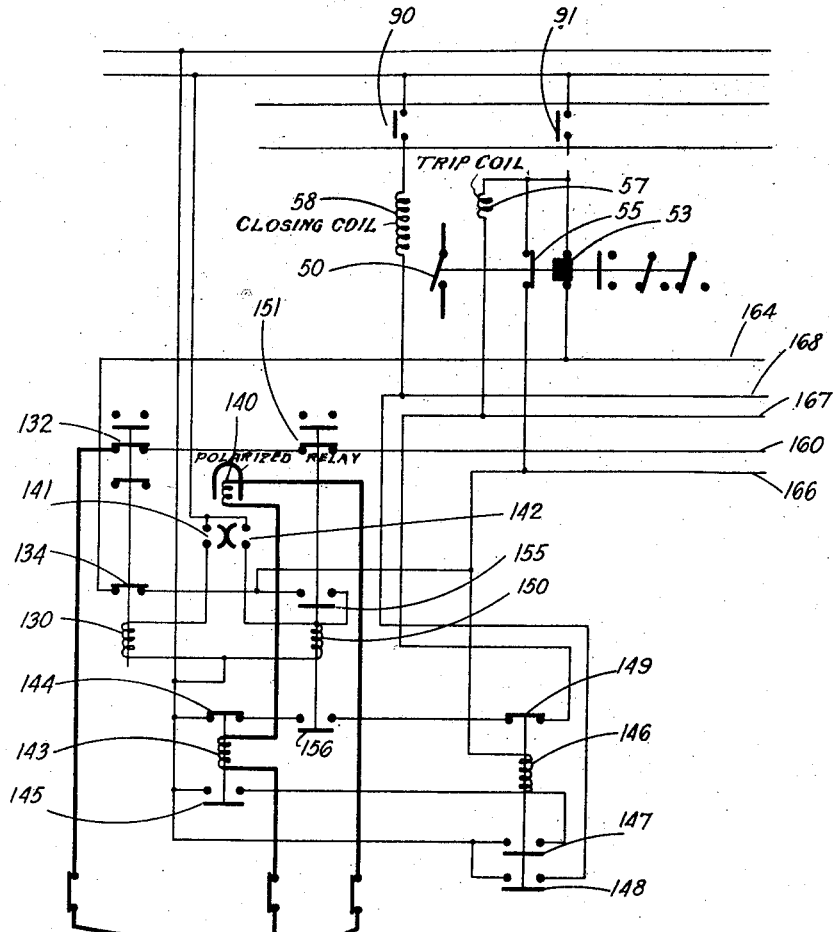
FIG. 18.
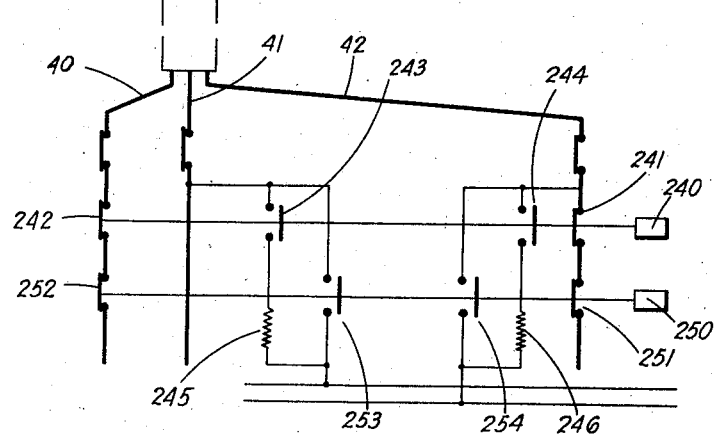

Aug. 25, 1931.  B. H. LEESON ET AL  1,820,354
ELECTRICAL REMOTE CONTROL SYSTEM
Filed Nov. 12, 1928   20 Sheets-Sheet 14

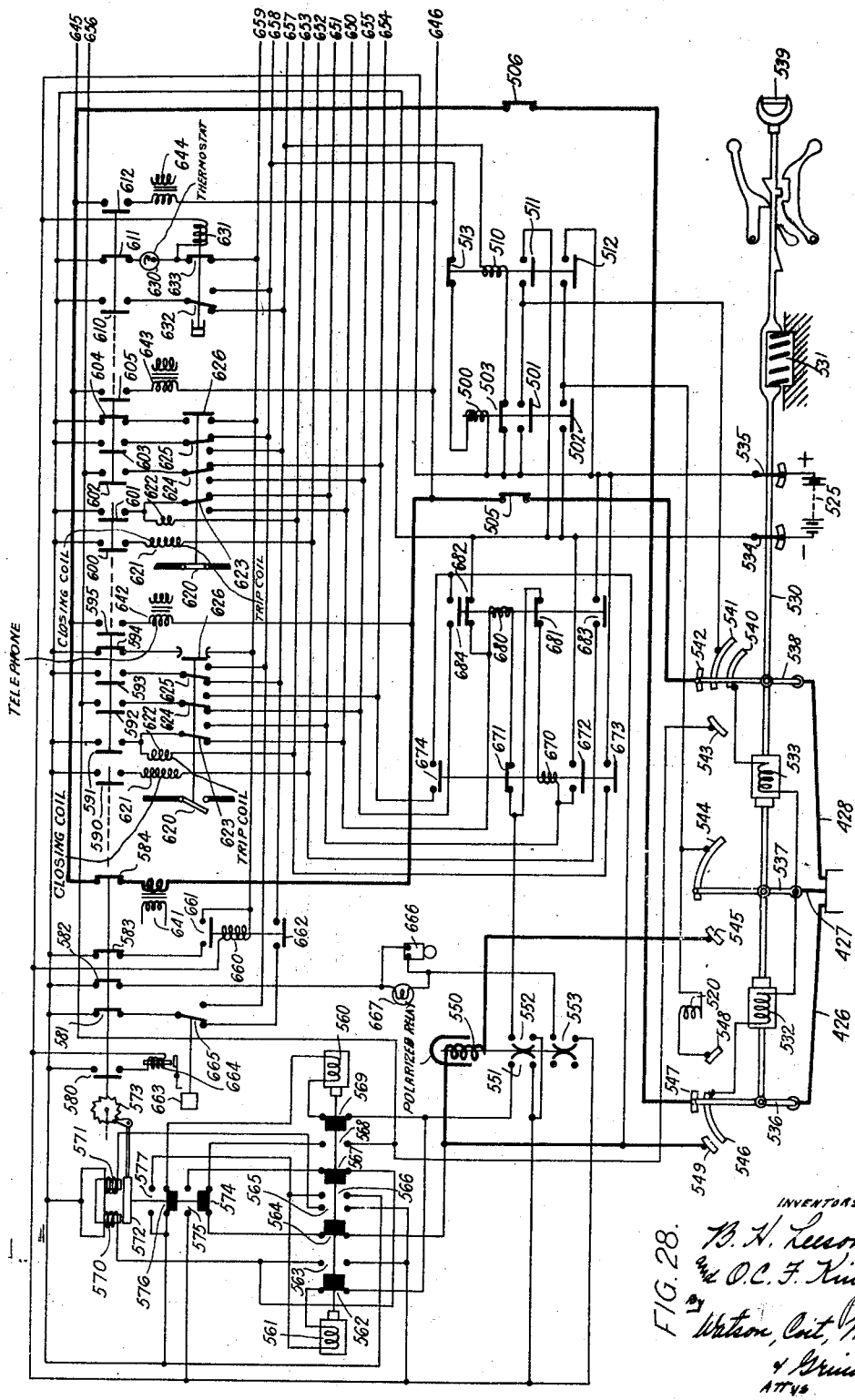

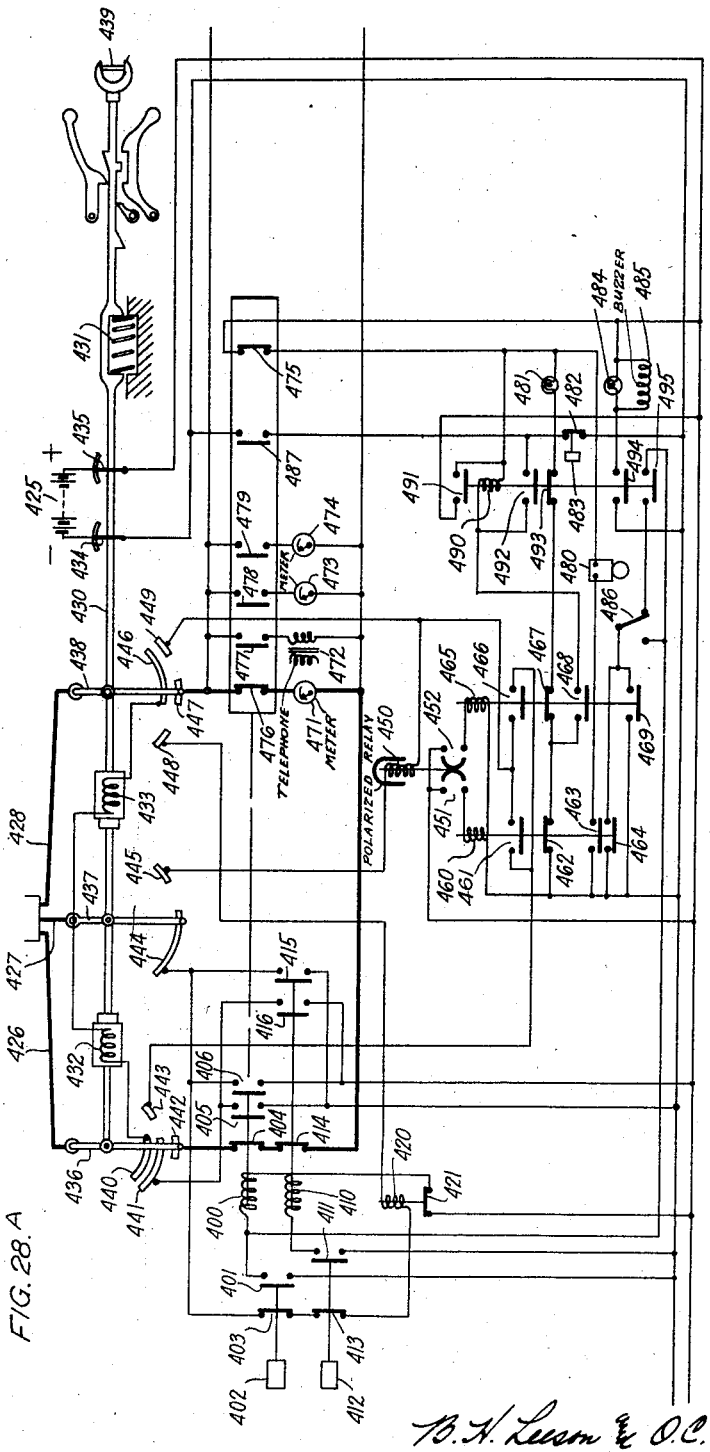

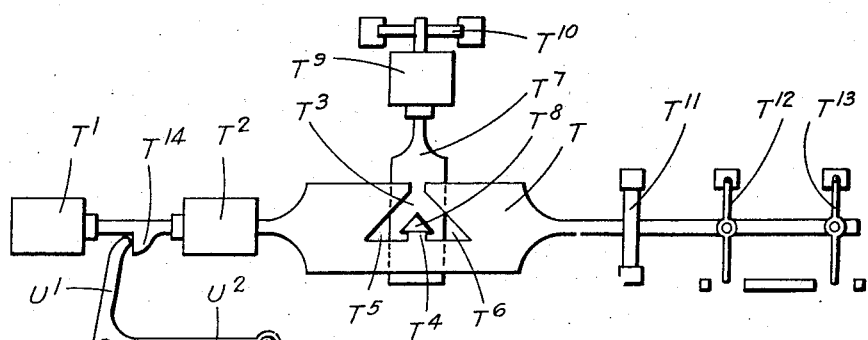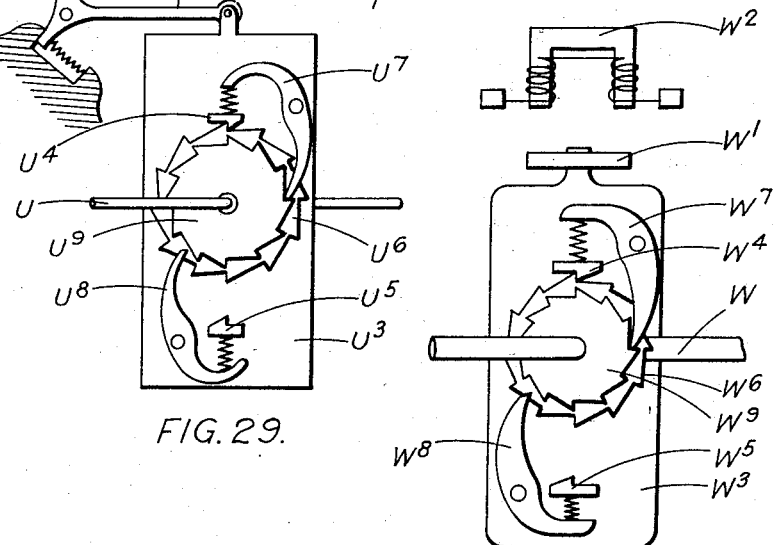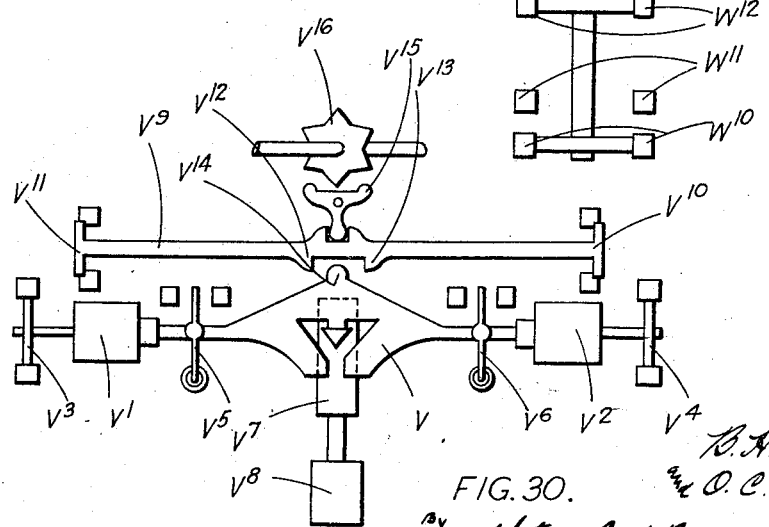

Patented Aug. 25, 1931

1,820,354

UNITED STATES PATENT OFFICE

BRUCE HAMER LEESON, OF TYNEMOUTH, AND OTIS CARTER FORMBY KING, OF LONDON, ENGLAND, ASSIGNORS TO A. REYROLLE & COMPANY, LIMITED, OF HEBBURN-ON-TYNE, ENGLAND, A COMPANY OF GREAT BRITAIN

ELECTRICAL REMOTE CONTROL SYSTEM

Application filed November 12, 1928, Serial No. 318,972, and in Great Britain December 6, 1927.

This invention relates to electrical remote control systems, and although not limited thereto has more especial reference to a selective remote control system for a number of switches or other apparatus at an electric substation. Thus for instance the invention is especially suitable for the control from a control station of a group of circuit-breakers or other apparatus at an electric power substation, wherein the operator at the control station can transmit selecting currents over pilot wires to the substation to cause the selection of the individual circuit-breakers or other apparatus or executive currents to cause the operation of the selected apparatus, whilst currents can be transmitted from the substation to the control station for the purpose of giving an indication of the condition of the selected apparatus.

The main object of the invention is to improve and simplify the remote control system and to enable robust mechanical apparatus to be employed to a large extent in place of the comparatively delicate electrical apparatus commonly used.

A more specific object of the invention is to ensure that the controlling apparatus at the control station can only be operated when the controlled apparatus is in a condition suitable for such operation.

Another object of the invention is to provide efficient means for ensuring accurate correspondence of movement between two step-by-step selecting devices.

A further object of the invention is to reduce the number of pilot wires necessary to a minimum and to make the most economical use of the pilot wires consistent with efficient and simple operation.

Yet another object of the invention is to provide a convenient practical form of selective indicating mechanism for use at the control station to indicate the condition of substation apparatus.

Still further objects of the invention will be apparent from the appended claims and from the following description of the accompanying drawings, which illustrate by way of example two convenient arrangements according to the invention (together with some modifications thereof), these arrangements being described with reference to their application to a selective remote control system for a number of circuit-breakers or other apparatus in an electric power substation.

Figure 2:
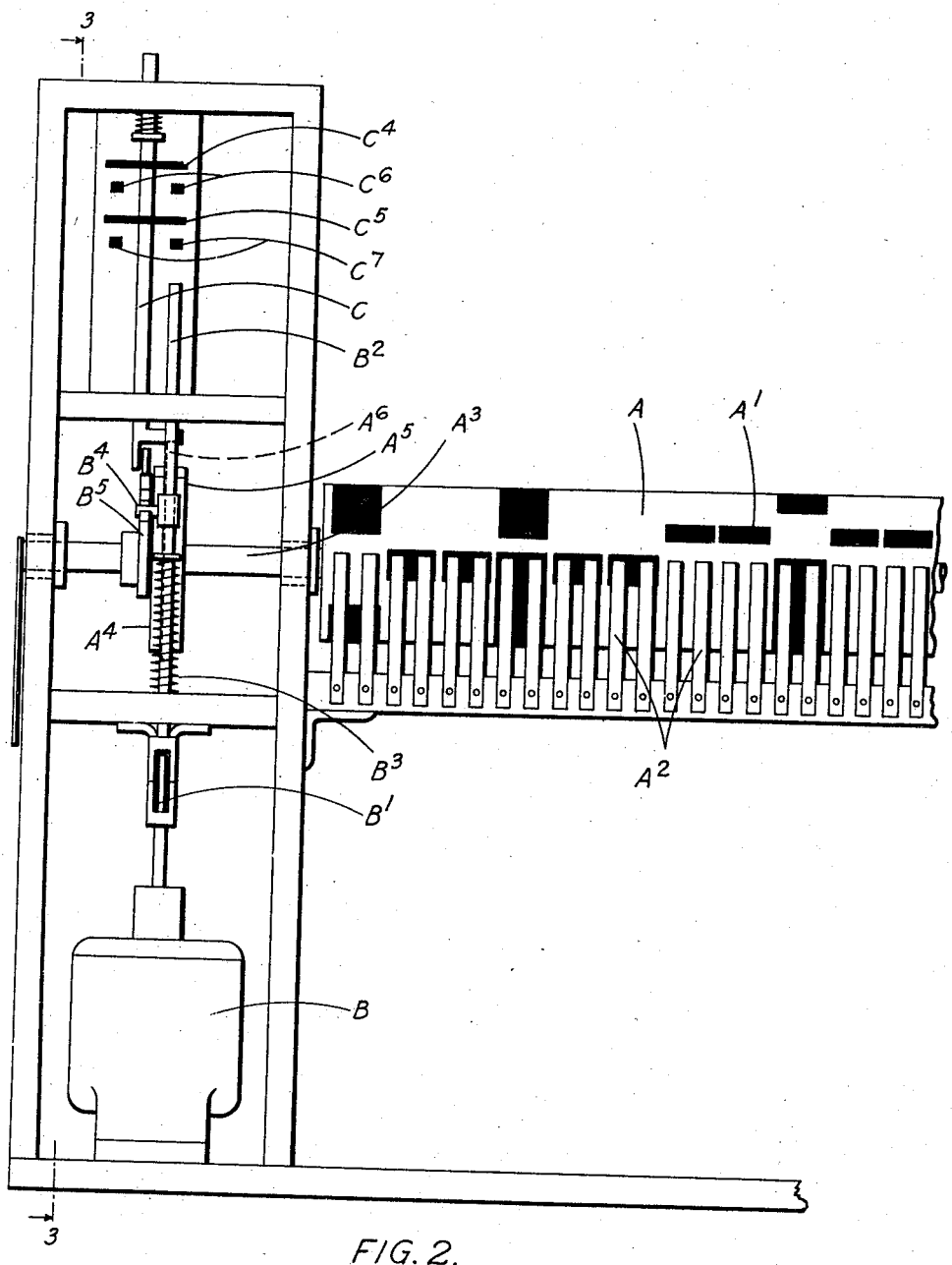
Figure 5:
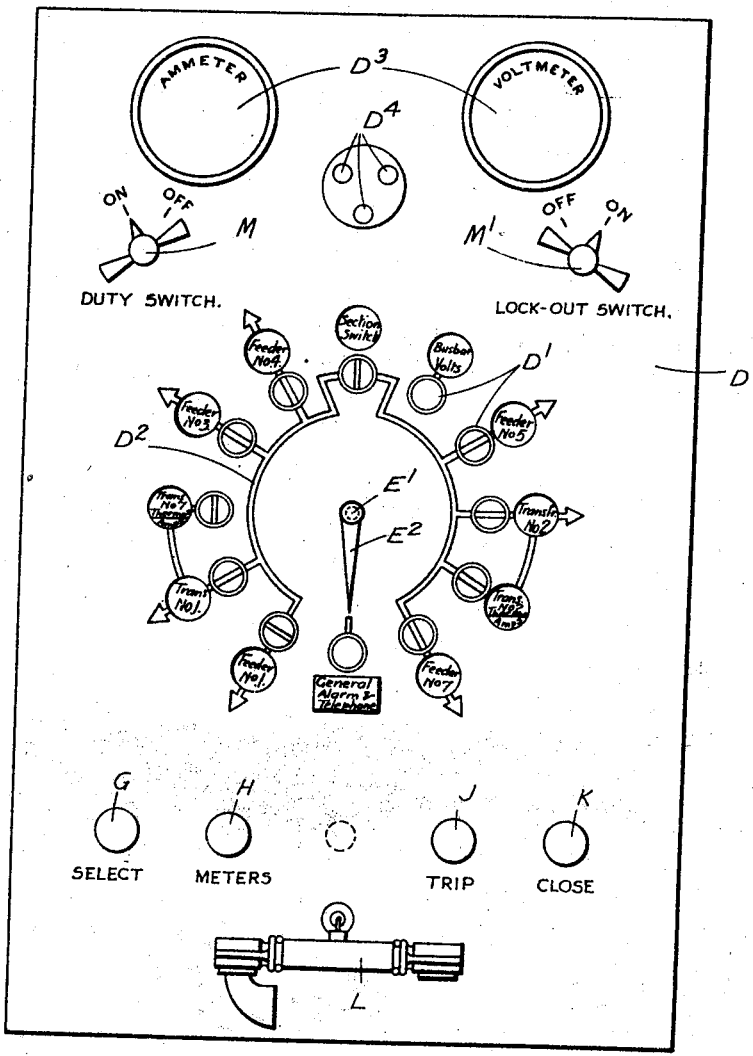
Figure 6:
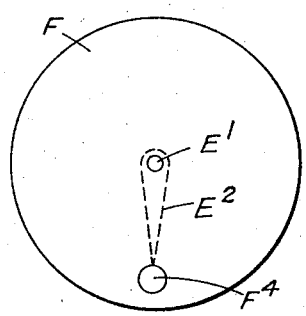
Figures 7, 8:
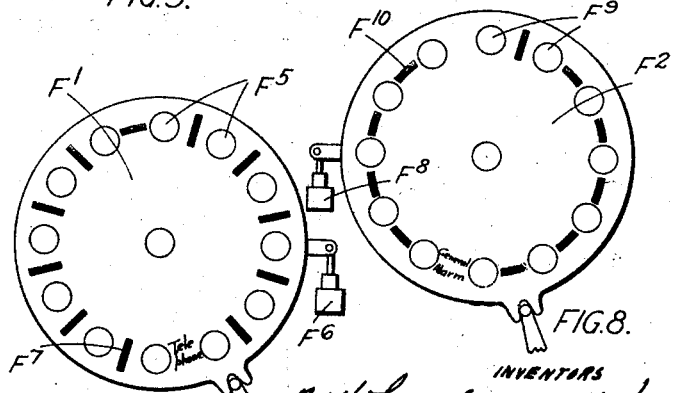
Figure 11:
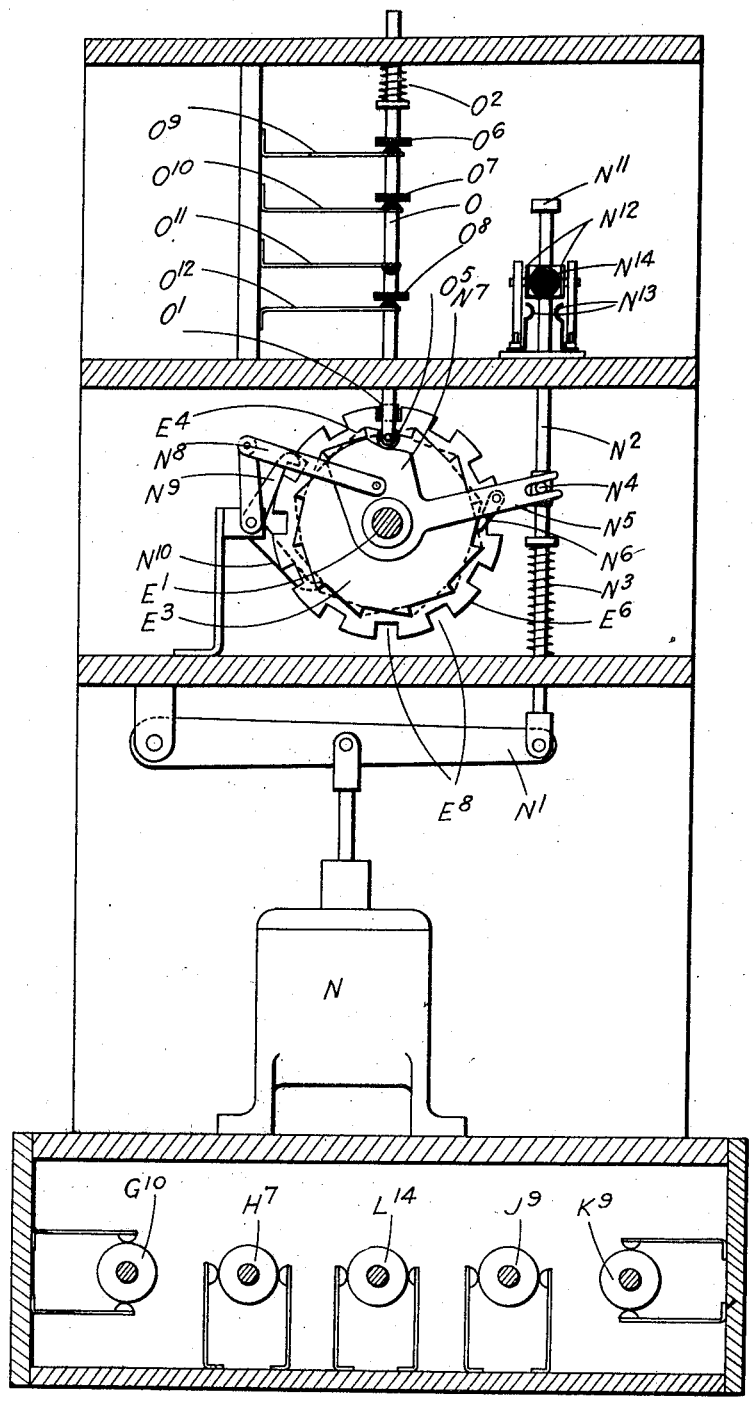
Figure 12:
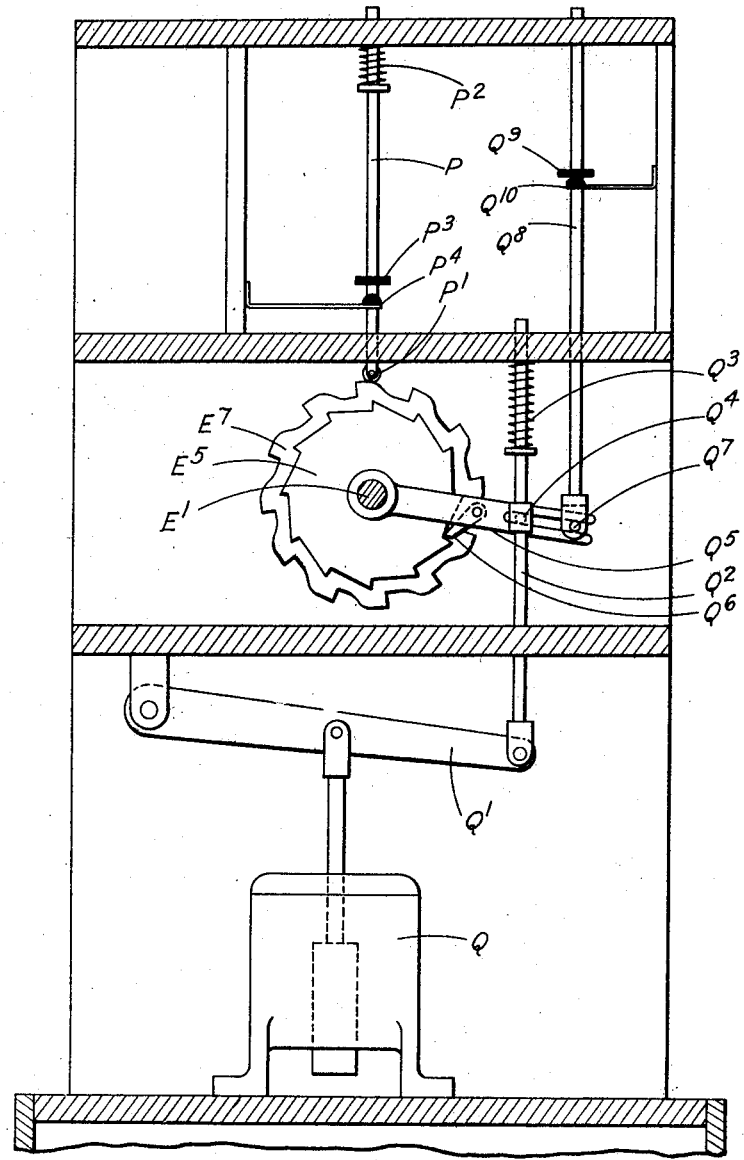
Figure 13:
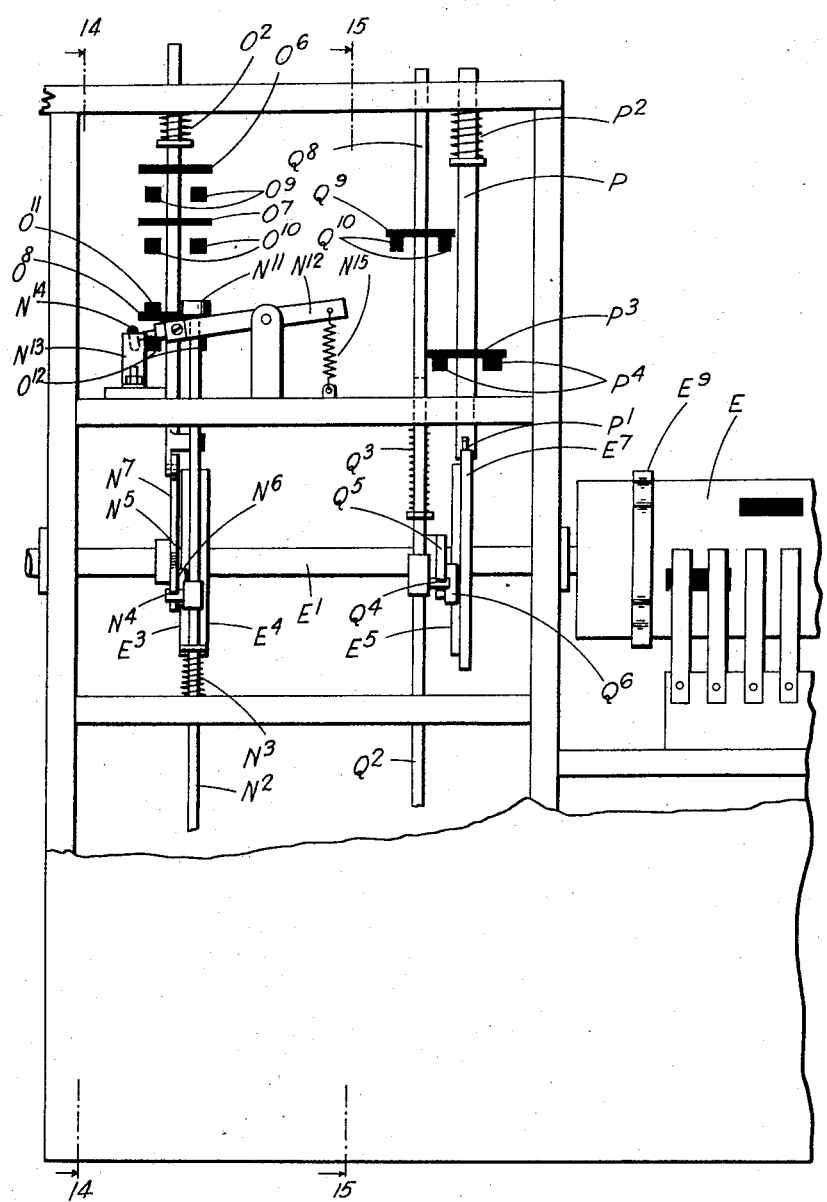
Figure 14:
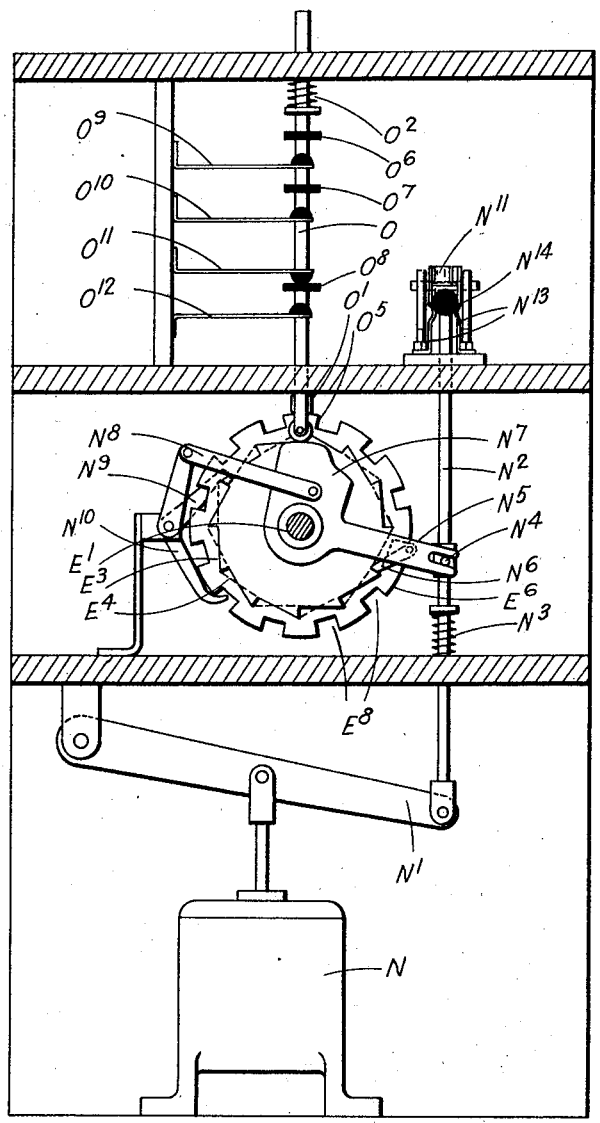
Figure 15:
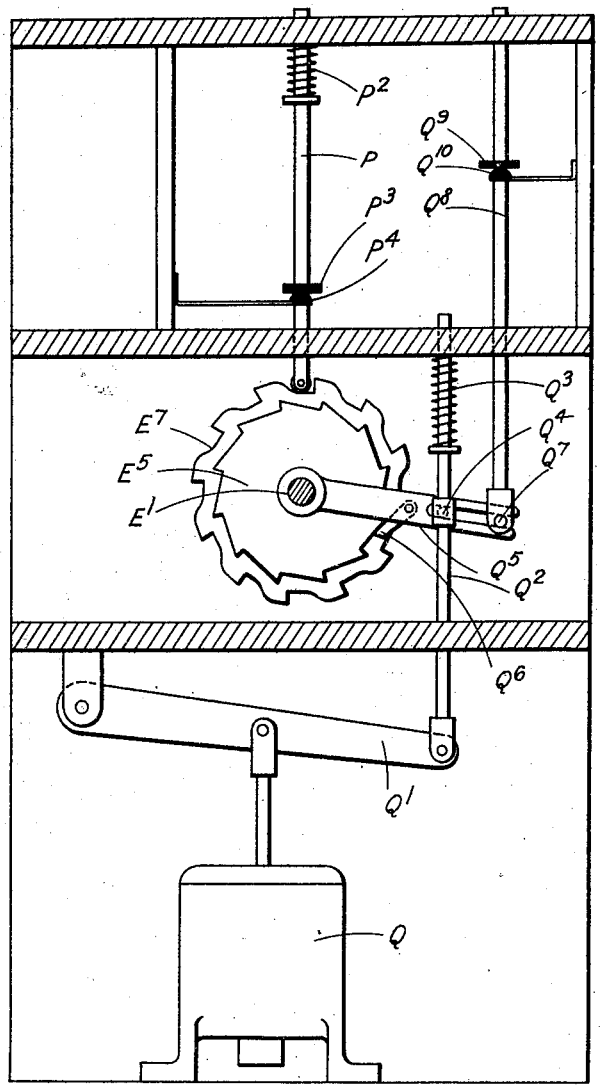
Figure 24:
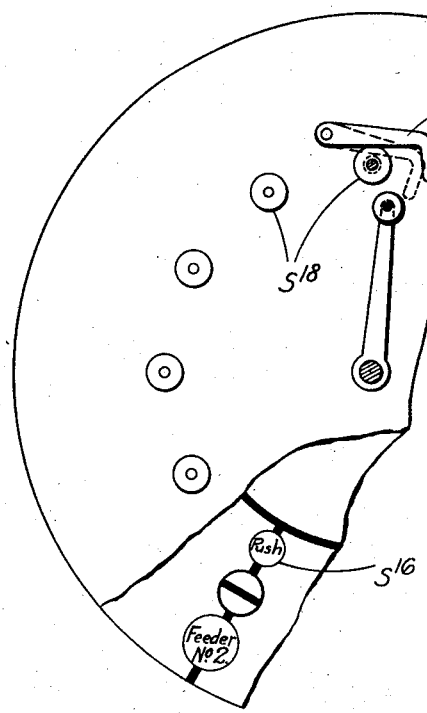
Figure 25:
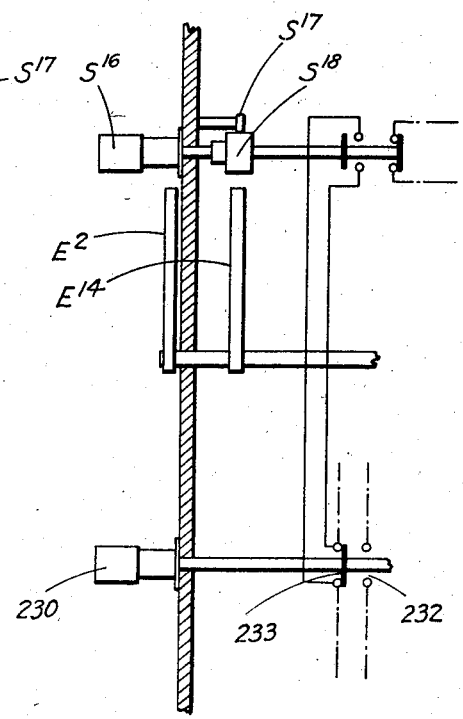
Figure 26:
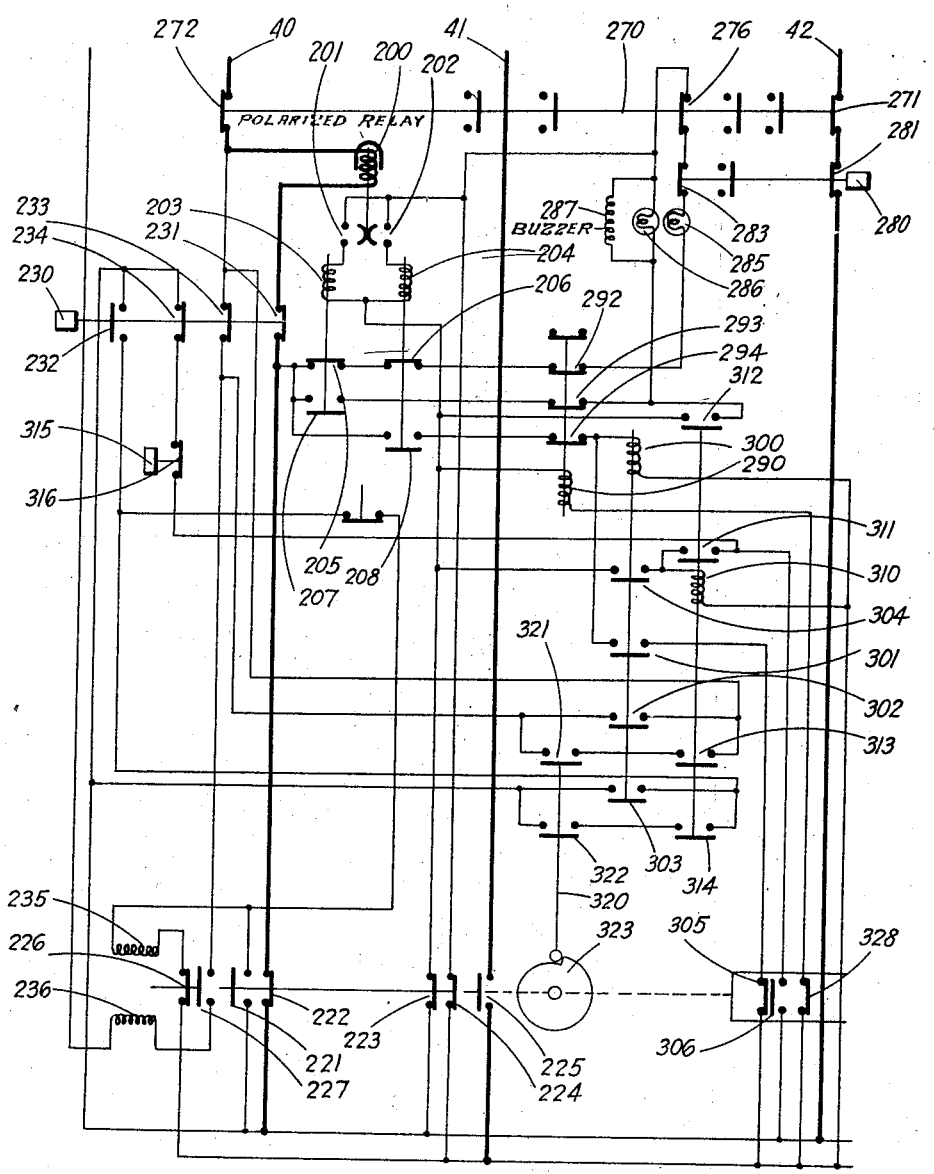
Figure 27:
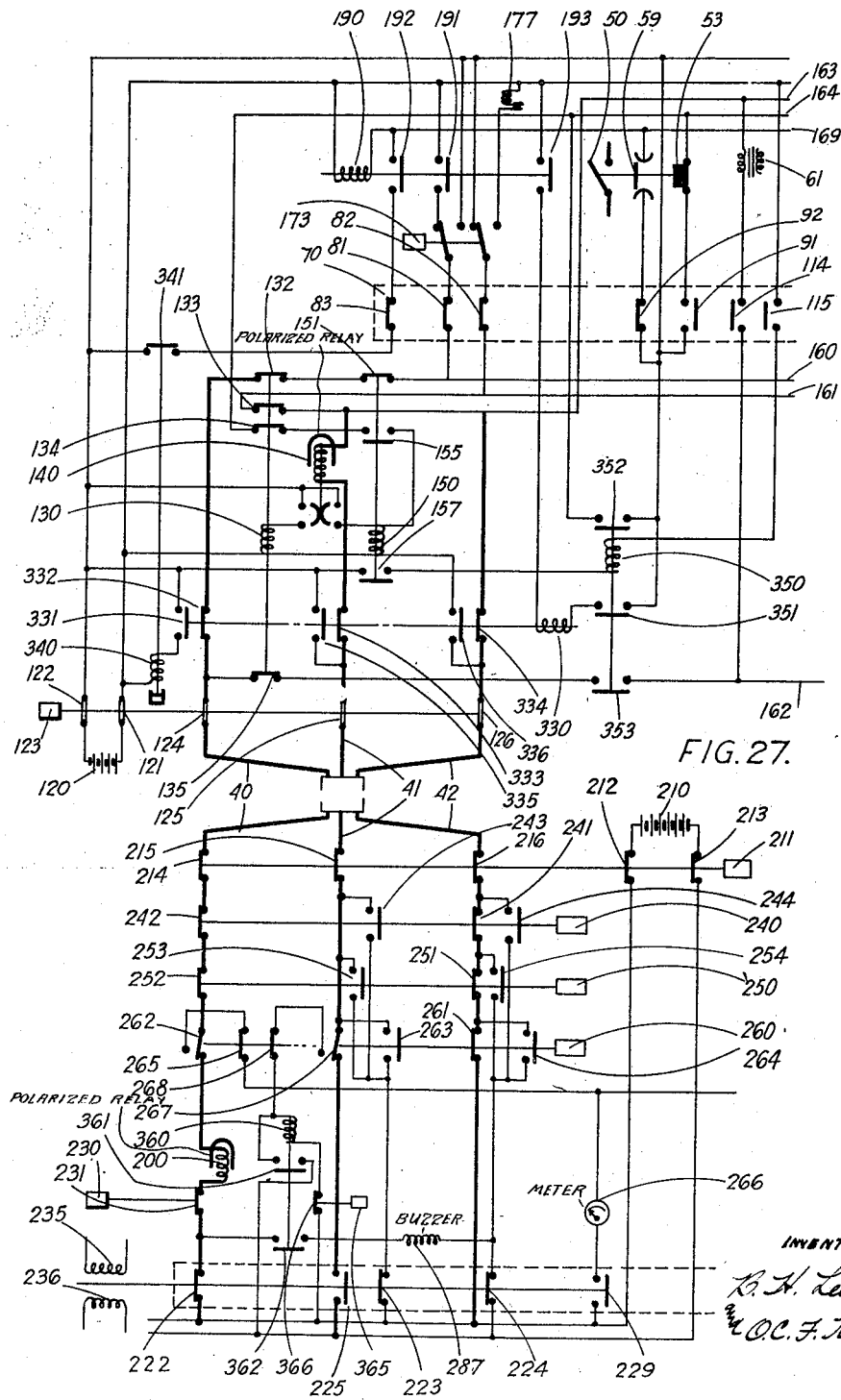

In these drawings,

Figures 1 and 1a are circuit diagrams of the first arrangement,

Figure 2 shows a convenient practical construction for the substation selector in the arrangement of Figure 1, Figure 3 is a transverse section on the line 3—3 of Figure 2, Figure 4 shows part of the mechanism of Figure 3 in a different operative position, Figure 5 is a front view of the indicating panel at the control station, Figures 6–8 are detached views of parts of the indicating mechanism, Figure 9 is a side elevation (with the casing removed) of the control station apparatus, Figures 10–12 are sections respectively on the lines 10—10, 11—11 and 12—12 of Figure 9, Figures 13–15 are views similar to Figures 9, 11 and 12 showing the mechanism in a different operative position, Figure 16 is a section on the broken line 16—16 of Figure 9, Figure 17 is a horizontal section on the line 17—17 of Figure 9, Figure 18 is a circuit diagram of a modified arrangement, Figures 19–25 illustrate diagrammatically some further modifications, Figures 26 and 27 are circuit diagrams of two other modifications of the arrangement of Figure 1, Figures 28 and 28a are circuit diagrams of the second arrangement, Figures 29 and 30 are diagrammatic views of mechanism employed in this second arrangement, and Figure 31 shows diagrammatically a modification of this arrangement.

The arrangement of Figures 1–17 will now be described first of all with reference to the circuit diagram of Figures 1 and 1a, the latter showing the control station apparatus, and the former showing the sub-station apparatus.

The control station and the substation are connected together by means of three pilot wires 40, 41, 42 arranged in the form of a three-core cable having a lead sheath indicated at 43. The apparatus at the substation includes in addition to the circuit-breakers or other controlled apparatus (two circuit-breakers 50 one open and one closed being shown on the drawings by way of example in addition to a thermostat 60 and a current transformer 61), a rotary selector indicated diagrammatically at 70. This selector 70, of which constructional views are given in Figures 2–4 to be referred to later, has step-by-step movements imparted to it by ratchet mechanism operated by a solenoid 71, and these movements successively operate groups of selector drum contacts associated with the individual controlled apparatus, whilst a further group of contacts 80—85 are operated when the selector 70 moves into the normal zero position shown in Figure 1. Thus the contacts 90—94 of one group are operated when the selector is moved from its zero position to the second selecting position and are associated with the first of the two circuit-breakers 50. The contacts 100—104 are operated in the third selecting position and are associated with the other circuit-breaker 50, whilst the contacts 110—114 are operated in the fourth selecting position and are associated either with the thermostat 60 or with the current transformer 61. Other groups of contacts would similarly be operated in other selecting positions and would be associated with other substation apparatus. A local battery 120 is provided in the substation, the connections to which are controlled by normally closed contacts 121, 122 on a lockout switch 123, which also has contacts 124, 125, 126 controlling the three pilot wires 40, 41, 42.

The selector solenoid 71 is energized from the substation battery 120 under the control of contacts 131 on a selector relay 130, whose operation is in turn controlled by the contacts 141 of a polarized relay 140 energized by currents transmitted from the control station over the pilot wires 41, 42. The polarized relay 140 also has contacts 142 controlling an executive relay 150, the arrangement being such that either the selector relay 130 or the executive relay 150 is operated in accordance with the polarity of the current received from the control station. The selector actuating mechanism, as will be described later with reference to Figures 2–4, causes contacts 72, 73 to be closed immediately the selector 70 reaches a new selecting position, these contacts opening when the mechanism resets itself. These contacts 72, 73 control a circuit from the substation battery 120 (or from an A. C. source) over the pilot wire 40 and the lead sheath 43 of the pilot cable for the purpose of transmitting a release current to the control station to indicate that the substation selector 70 has completed its movement.

The selector relay 130 has three further sets of normally closed contacts 132, 133, 134, two of which control the connection to the pilot wires 40, 42 from two indicating busbars 160, 161 common to the substation controlled apparatus. These two busbars are energized from the battery 120 with one polarity or the other, when the selector 70 is moved into a new selecting position, in accordance with the condition of the selected apparatus. The connections from the battery 120 to the busbars 160, 161 are controlled by pairs of selector contacts 93, 94 or 103, 104, or 111, 112 closed only when the selected position is reached and by auxiliary switches 51, 52 of the change-over type on each of the controlled circuit-breakers 50 or by similar change-over switches 63, 64 on a time-lag thermostat relay 62 energized when the thermostat 60 closes its contacts. Thus an indicating current of one polarity or the other, in accordance with whether the selected circuit-breaker or thermostat or other apparatus is closed or open will be transmitted to the control station over the pilot wires 40, 42 immediately each selected position is reached, the indicating circuit being broken at contacts 132, 133 when the selector relay 130 is operated. Thus the indicating circuit can be traced from substation battery 120, through lock-out contacts 121, 122, selector contacts 93, 94 (or 103, 104 or 111, 112), auxiliary switches 51, 52 (or 63, 64) to busbars 160, 161 the busbar 160 being connected through contacts 151, 132 and 124 to pilot wire 40 and the busbar 161 through contacts 133 and 126 to pilot wire 42, the circuit being completed through control station apparatus shortly to be described.

The above substation apparatus is associated primarily with the operations of selection and indication, and before the remaining substation apparatus is described, a description will first be given of the control station apparatus associated with these two operations.

At the control station end the pilot wires 40, 42, over which the indicating currents are transmitted from the substation, are connected to a polarized relay 200, the control station end of the indicating circuit being traced from pilot wire 40 through contacts 214, 242, 252, 262, 272, polarized relay 200 and contacts 231, 222, 281, 271, 261, 251, 241, 216 to pilot wire 42. The polarized relay 200 closes one or other of two sets of contacts 201, 202 in accordance with the polarity of the indicating current and thereby energizes from a control station battery 210 through contacts 212, 213, 223, 224 either a positive coil 203 or a negative coil 204 these two coils (besides operating contacts 205, 206, 207, 208) acting to cause suitable indicating mechanism, to be described later to give an indication as to whether the selected circuit-breaker or other apparatus is open or closed. The determination (for indicating purposes) as to which circuit-breaker has been selected is mechanically effected by a rotary selector, indicated at 220, to which step-by-step movements are imparted corresponding to the movements of the substation selector 70, the control station selector, however, performing two half-notch movements for each full-notch movement of the substation selector.

The step-by-step movements of the two selectors 70, 220 are in initiated at the control station by a selecting hand-switch 230 of the push-button type. This selecting push, when depressed, acts at contacts 231 to break the indicating circuit to the polarized relay 200 and also to complete at contacts 232 a circuit from the control station battery 210 through contacts 212, 213, 226 to what may be termed a first motion solenoid 235 which acts through suitable mechanism (to be described later) to rotate the selector 220 through its first half-notch movement. Various parts of the selector actuating mechanism are also utilized for contact-operation. Thus as soon as the armature of the solenoid 235 begins to move a group of contacts 221, 222, 223, 224 are simultaneously operated. The contacts 222 again break the indicating circuit and the contacts 223, 224 break circuits over which the executive currents are transmitted to the substation, whilst the contacts 221 make a holding circuit for the solenoid 235 independent of the selecting push 230 which may now be released. This holding circuit runs from the battery 210 through contacts 212, 221 to the solenoid 235 and thence through contacts 226, 213 back to the battery 210. (If the push is released too quickly before this holding circuit is made, the parts which have moved will return to their normal positions without causing any further operation). The movement of the armature of the solenoid 235 also causes contacts 225 to be closed to complete a circuit to the substation polarized relay 140, this circuit extending from control station battery 210 through contacts 212, 281, 271, 261, 251, 241, 216, pilot wire 42, contacts 126, polarized relay 140, contacts 125, pilot wire 41 and contacts 215, 225 and 213 to battery 210. When the first half-notch movement is completed contacts 227 are operated to prepare the circuit to a second motion solenoid 236. As will be explained later, the control station apparatus remains locked in the half-notch position until the substation selector has completed its movement and has closed the contacts 72, 73 to transmit a release current over the pilot wire 40 and the lead sheath 43 of the pilot cable. Provided the selecting push 230 has meanwhile been released to close its contacts 233, this release current energizes the second motion solenoid 236 over the circuit from substation battery 120, contacts 121, 72, lead sheath 43, solenoid 236, contacts 227, 233, 272, 262, 252, 242, 214, pilot wire 40, and contacts 124, 73, 122 to battery 120. The movement of the armature of the second motion solenoid 236 causes the contacts 226, 225 to open to deenergize the first motion solenoid 235 and also the substation polarized relay 140, thus causing the substation apparatus to reset itself with the selector 70 in its new selecting position, the contacts 72, 73 being opened. This deenergizes the second motion solenoid 236 and the return movement of its armature acts through suitable mechanism to drive the selector 220 through its second half-notch movement, the contacts 221—224, 226 and 227 returning to their normal positions ready for the next selecting movement. Thus it is not until the whole movement is completed that the contacts 222 close to complete the indicating circuit and allow the indicating mechanism to give the desired indication of the condition of the selected circuit-breaker or other substation apparatus.

As mentioned above the substation polarized relay 140 controls not only the selector relay 130 but also an executive relay 150, which when operated causes some function to be performed in the substation, such as the tripping or closing of a circuit-breaker or the preparation of metering circuits or the completion of a telephone circuit. Thus current of one polarity sent from the control station over the pilot wires 41, 42 causes the polarized relay 140 to operate the selector relay 130, whilst current of the opposite polarity causes the operation of the executive relay 150. The transmission of current for the operation of the executive relay is initiated by means of one or other of a number of executive hand-switches of the push-button type disposed on the control panel adjacent to the selecting push 230. Conveniently there are three executive pushes which may be termed the trip push 240, the close push 250 and the meters push 260 respectively, whilst a fourth dummy push 270 is provided in association with a telephone instrument indicated at 278. As will be described in detail later, these four pushes are mechanically interlocked with one another, with the selecting push 230, with the selector 220, and also with a duty switch 280 and a lock-out switch 211 which controls the connections of the control station apparatus to the battery 210 at contacts 212, 213 and to the pilot wires 40, 41, 42 at contacts 214, 215, 216. Operation of the duty switch 280 opens the pilot wire 42 at contacts 281 to cut the control system out of action and at the same time closes contacts 282 to illuminate a yellow lamp 284 and opens contacts 283 in the circuit to a green lamp 285, the yellow lamp indicating that the apparatus is out of commission for the time whilst the green lamp indicates that the apparatus is in its normal condition. The normally closed circuit to the green lamp may be traced from battery 210 through contacts 213, 224, 276, 283, lamp 285 and contacts 292, 206, 205, 222, 212 to battery 210.

The manner in which the four executive pushes cause the desired operation to be performed in the substation will now be described. This may be done in various ways but preferably the four executive pushes are arranged to cause identical currents to be transmitted over the pilot wires 41, 42, electrical interlocks operated in accordance with the condition of the substation apparatus being utilized to ensure that the correct operation is performed. Thus the trip push 240 opens the pilot wires 42, 40 at contacts 241, 242 and connects the control station battery 210 across the pilot wires 41, 42 at contacts 243, 244, the polarity of the current thus transmitted over these pilot wires being opposite to that of the selecting current. The contacts 251—254 of the close push 250, the contacts 261—264 of the meters push 260 and the contacts 271—274 of the telephone dummy push 270 perform like functions when these pushes are depressed. Thus operation of any one of these four pushes will transmit an executive current from the control station battery 210 through contacts 212, 223, 243 (or 253 or 263 or 273), 215, pilot wire 41, contact 125, polarized relay 140, contact 126, pilot wire 42 and contacts 216, 244 (or 254 or 264 or 274), 224, 213 to battery 210, and will thus cause the substation polarized relay 140 to energize the executive relay 150. The telephone dummy push 270 has three extra sets of contacts 275, 276, 277 of which the first prepares the telephone speaking circuit over the pilot wires 40, 42, whilst the other two respectively break the circuit to the green lamp 285 and make the circuit to the yellow lamp 284.

The executive relay 150 has five sets of contacts 151, 152, 153, 154, 155, one of which 151 is normally closed and breaks the indicating circuit when the relay is energized, whilst the other four are normally open. One of these sets of contacts 152 controls a telephone calling circuit to a buzzer 170, this circuit being taken from substation battery 120 through contact 121, buzzer 170, contact 152, telephone receiver hook switch 172, selector contact 84 (closed only when the selector is in the normal zero position) and contact 122 to battery 120. Another set of contacts 153 connects a metering busbar 162 to the pilot wire 40 through contacts 132, 124, a second metering busbar 163 being connected to the pilot wire 42 through contact 126. This metering circuit is completed at the substation end through selector contacts, such as 114 associated with the current transformer 61, such selector contacts only being closed in metering positions. The metering circuit is also utilized as a telephone speaking circuit, the substation telephone being indicated at 171 with its receiver hook switch 172 in the calling circuit, such speaking circuit being controlled by the selector contacts 85 closed only in the normal zero position. The executive relay contacts 154 control a circuit to a trip relay 180 or a close relay 185 whose functions will shortly be described. The remaining contacts 155 control a retaining circuit for the executive relay, to render it independent, when necessary, of the polarized relay 140. This retaining circuit is taken from battery 120 through contact 121, executive relay 150, and contact 155 and thence through the selector relay contacts 134 and through normally closed contacts 181 on the trip relay 180 to a retaining busbar 164. The connections of the retaining busbar 164 to the substation battery are controlled by selector contacs 91, 101, 113 closed only in appropriate selector positions, and in the case when the selected position is associated with a circuit-breaker 50 this connection is also controlled by a la e-acting auxiliary switch 53 on the circuit-breaker, this switch being open when the circuit-breaker is closed and closed when the circuit-breaker is open. Thus the retaining circuit is closed for metering purposes and also in the case when it is desired to close an already open circuit-breaker. For tripping purposes, however, the retaining circuit is unnecessary owing to the very short time required for carrying out the tripping operation.

The trip and close relays 180, 185 are common to all the circuit-breakers 50 and the energizing circuit for each of them is controlled by interlock contacts 186 or 182 on the other, so that one relay cannot be energized unless the other is deenergized. The energizing circuit for the trip relay 180 is taken from battery 120 through contacts 121, 154, 186 to the trip relay 180 and thence to a trip relay busbar 165, which is connected to the substation battery 120 through selector contacts such as 91 or 101 and also through auxiliary switches 54 on the circuit-breakers 50, such switches being closed only when the corresponding circuit-breakers are closed. The energizing circuit for the close relay 185 similarly includes a close relay busbar 166, which is connected to the battery 120 through the selector contacts 91 or 101 and through circuit-breaker auxiliary switches 55 closed only when the corresponding circuit-breakers 50 are open. Thus neither relay can be energized unless the selector is in a circuit-breaker position, and moreover the trip relay can only be energized when the selected circuit-breaker is closed and the close relay when the circuit-breaker is open. Both relays are also provided with retaining contacts 183 and 187 respectively to maintain them energized throughout the tripping or closing operation independently of the circuit-breaker auxiliary switches 54, 55. The remaining contacts 184 of the trip relay energize a tripping busbar 167 to which the trip coils 57 of all the circuit-breakers are connected, the circuit to each trip coil, however, only being completed through the appropriate selector contacts such as 91 or 101. The remaining contacts 188 of the close relay energize a closing busbar 168 to which all the closing coils 58 of the circuit-breakers are connected, the circuit to each closing coil being similarly controlled by the selector contacts 90 or 100. The completion of the actual closing movement of the circuit-breaker opens the late-acting auxiliary switch 53 and thus breaks the retaining circuit to the executive relay 150, which (if the initial energizing circuit for the polarized relay 140 has meanwhile been broken at the control station) opens its contacts and deenergizes the close relay 185, at the same time reestablishing the indicating circuit. For the tripping operation no retaining circuit is made for the executive relay which consequently opens its contacts to deenergize the trip relay immediately the initiating circuit is broken at the control station.

It will be noticed that in metering positions, such as the fourth selector position, selector contacts 113 complete the retaining circuit for the executive relay 150 and this retaining circuit remains completed until the selector is moved on to the next position, so that if in such a position the meters push 260 is depressed for the purpose of causing the establishment of the metering circuit, the executive relay 150 will be energized and will remain energized until the next selecting movement. The actual metering circuit, which is completed at the substation end includes the metering busbars 162, 163, (directly connected together through the selected metering source 61 and the corresponding selector contacts 114), the contacts 153, 132, 124 and the pilot wires 40, 42, but this circuit is not completed at the control station end until the meters push 260 is released. The contacts 262 on the meters push are specially arranged, so that when the push is depressed they break the circuit to the polarized relay 200 and prepare another circuit from the pilot wire 40 through further contacts 265 (closed when the meters push is released) on the meters push and thence through a meter 266 and selector contacts 229 (closed only in the appropriate positions) back to the pilot wire 42. When the meters push 260 is released the contacts 261 complete the circuit to the pilot wire 42 but the contacts 262 remain in their new position, so that the whole metering circuit is complete and the desired readings can be taken on the meter 266. Thus the complete metering circuit runs from the selected metering source such as 61 and the associated selector contacts 114 through busbar 163, contact 126, pilot wire 42, contacts 216, 241, 251, 261, 271, 281, the appropriate selector contacts 229 and meter 266, contacts 265, 262, 252, 242, 214, pilot wire 40, contacts 124, 132, 153, and busbar 162 back to the source 61. This metering circuit remains complete until the selecting push 230 is depressed to initiate a new selective movement. The consequent movement of the substation selector breaks the metering circuit at contacts 114 and the executive relay retaining circuit at contacts 113, whilst the movement of the control station selector 220 acts through suitable mechansim, to be described later, to return the contacts 262 to their normal positions.

As mentioned above, the normal zero position of the selectors is not associated with any particular controlled apparatus at the substation but is reserved for certain special purposes, namely the establishment of telephone communication between the two stations and the transmission of a general alarm signal from the substation to the control station to give an indication that some change has taken place automatically in the condition of the controlled apparatus. The transmission of a telephone calling signal from the control station to the substation has already been described, the telephone speaking circuit being established in the usual manner by the lifting of the telephone receiver at the substation. The transmission of a telephone calling signal from the substation to the control station is initiated by the depression of a telephone push 173, which transfers change-over contacts 174, 175 from their normal positions and thus causes a current similar to the indicating currents to be transmitted over the pilot wires 40, 42 to the control station, the circuit for this current being taken from the substation battery 120 through lock-out contacts 121, 122, selector contacts 81, 82 (closed only in the general alarm position) and change-over contacts 174, 175, and thence through contacts 133 to pilot wire 42 and through an interrupter 177 and the contacts 151 and 132 to pilot wire 40. The telephone push 173 is preferably locked by an electromagnetic device 176 in all selector positions except the general alarm position, this device being energized through the selector contacts 80 which are open only in that position. The general alarm signal, the initiation of which will shortly be described, is also transmitted over the pilot wires 40, 42, but is of opposite polarity to the telephone calling current. The telephone or general alarm signals are received at the control station by the polarized relay 200 which operates the positive coil 203 or the negative coil 204. In this instance, however, the control station selector 220 is in its zero or general alarm position wherein selector contacts 228 are closed to energize a general alarm position relay 290. This relay has three sets of contacts, of which the first 291 controls the telephone speaking circuit and the second 292 is in series with the positive and negative coil contacts 205, 206 to control the green lamp circuit, whilst the third 293 controls the circuit to a red lamp 286 and a buzzer 287, this circuit being taken from battery 210 through contacts 212, 222 and the parallel-connected contacts 207, 208 of the positive and negative coils and thence through contact 293, red lamp 286 and buzzer 287, and contacts 225, 213 to the battery 210. Thus the energization of either the positive coil 203 or the negative coil 204 in the general alarm position extinguishes the green lamp 285 and lights the red lamp 286 and also causes the buzzer 287 to sound. A special interrupting device 177 is provided in the substation whereby a telephone signal causes the buzzer 287 to sound intermittently whilst a general alarm signal causes the buzzer to sound continuously. This intermittent buzzing is also useful in that it provides a distinctive signal in one selector position, so that the operator can check whether the two selectors are correctly in synchronism with one another whenever a telephone signal is received. On receipt of a telephone calling signal the control station operator must send an answering call to the substation in the manner above described, whereupon the substation operator lifts his receiver to establish the speaking circuit.

A general alarm signal may be initiated by the automatic tripping or the automatic reclosing of a circuit-breaker 50 or by the overheating of a thermostat 60 or by other changes of condition in the substation apparatus. A general alarm relay 190 is provided in the substation whose contacts 191 act to complete a circuit for the transmission of the general alarm signal to the control station, this circuit being taken from substation battery 120 through contacts 121, 81, 174, 191, 151, 132, 124, pilot wire 40, contacts 214, 242, 252, 262, 272, polarized relay 200, contacts 231, 222, 281, 271, 261, 251, 241, 216, pilot wire 42 and contacts 126, 133, 175, 82, 122 to battery 120, the selector contacts 81, 82 being closed only in the general alarm position. The general alarm relay 190 is connected on one side to the substation battery 120 and on the other to a general alarm busbar 169 and the manner in which this energizing circuit is completed will depend on the nature of the apparatus whose condition has changed. Thus in the case of a circuit-breaker 50, the circuit is completed by a "flick" switch 59, i. e. an auxiliary switch on the circuit-breaker which is open in either position of the circuit-breaker but closes momentarily during movement of the circuit-breaker from one position to the other. If the circuit-breaker is not arranged for automatic reclosing, the flick switch 59 is such that it operates only during tripping of the circuit-breaker but not during closing. In the case of the overheating of a thermostat 60, its contacts besides energizing the time-lag relay 62 also complete the energizing circuit to the general alarm relay, this circuit being broken at contacts 65 as soon as the thermostat relay 62 operates. Similar arrangements are also made for other types of substation apparatus, the arrangement in each case being such that the energizing circuit for the general alarm relay is made momentarily whilst the change of condition of the apparatus is taking place. The energizing circuit for the general alarm relay is taken through selector contacts, such as 92, 102, 110 which are closed in various selector positions as will be described below, these contacts however all being closed when the selector is in its normal zero position. The general alarm relay 190, when energized by the momentary current, at once makes its own retaining circuit at contacts 192, this circuit being taken through the selector contacts 83 which are closed in certain selector positions.

The arrangement of the selector contacts which cooperate in a general alarm will now be described. In the first place the contacts 81, 82 which are closed in the zero position and are open in all other positions, ensure that the general alarm signal can only be transmitted to the control station when the selector is in its zero position. In the second selector position, i. e. that immediately following the zero position, the contacts 83 controlling the retaining circuit for the general alarm relay are broken, since the general alarm signal has just been sent to the control station in the zero position and it is necessary to deenergize the general alarm relay ready for a new general alarm initiation. The contacts 83 are however closed in all other selector positions.

The arrangement of the selector contacts 92, 102, 110 etc. controlling the energizing circuit for the general alarm relay is such that this relay cannot be energized by a change of condition in the circuit-breaker or other apparatus associated with the position which the selector occupies at any moment. Thus the contacts 92 are open in the second selector position, the contacts 102 are open in the third selector position, the contacts 110 are open in the fourth selector position and so on, all these contacts being closed in all other positions. The reason for this is that it is not desired to initiate a general alarm when the change of condition results from remote operation of the controlled apparatus from the control station, and if it should happen that the condition of such apparatus changes automatically whilst the selector is in the corresponding position, a general alarm would be unnecessary since the indicating circuits for such apparatus are complete and the change of condition would be at once apparent to the operator at the control station. Thus when the selector is in any position other than the zero position, a general alarm can be initiated by a change in the condition of apparatus associated with all positions other than the selected position. The initiation of a general alarm under such circumstances causes the general alarm relay 190 to operate and complete its retaining circuit, but nothing further happens until the selecting cycle has been completed and the normal zero position again reached, when the stored general alarm will be transmitted to the control station.

In the foregoing description each selecting movement has been referred to as initiated by a separate depression of the selecting push 230, but it will usually be desirable to provide means whereby the operator can proceed directly to one of the later selected positions without repeated depression of the selecting push. Such "express" selection can be effected in various ways to be described later, and the description of the general alarm initiation given in the last paragraph assumes that express selection is available. In cases where no provision is made for express selection, it will be unnecessary for a general alarm to be initiated as the result of a change of condition of apparatus associated with a selector position in advance of that which the selector occupies, for the control station operator must proceed through the remaining selector positions in order to return to the zero position and would thus become aware of the change which has taken place.

The mechanical construction of the apparatus employed in this arrangement will now be described, the substation selector and its associated mechanism (shown in Figures 2–4) being taken first.

The substation selector consists of an insulating drum A bearing spaced conducting segments such as $A^1$, which bridge the gap between pairs of fixed spring contact arms, such as $A^2$. Figure 2 shows part only of the selector drum A, the contacts shown on this figure corresponding to the contacts 80—85 and 90—94 of Figure 1. This drum A is mounted on a spindle $A^3$ carrying two oppositely disposed ratchet wheels $A^4$ $A^5$ and a disc $A^6$ having recesses $A^7$ in its edge. As illustrated, the selector has twelve selecting positions, and consequently the ratchet wheels $A^4$ $A^5$ each have twelve teeth and the disc $A^6$ has twelve recesses $A^7$.

The selector solenoid B (indicated at 71 in Figure 1) acts, when energized, through a lever $B^1$ to pull down a rod $B^2$ against the action of a spring $B^3$. The rod $B^2$ carries a pin $B^4$ engaging in the slotted end of an arm $B^5$ rotatably mounted on the selector spindle $A^3$, this arm having pivoted to it a pawl $B^6$ cooperating with the ratchet wheel $A^4$. The arm $B^5$ also carries a cam $B^7$ on which runs a roller $C^1$ carried by a locking bolt C, the roller being pressed into engagement with the cam by a spring $C^2$. The locking bolt C has a projection $C^3$ cooperating with the recessed disc $A^6$ on the selector spindle $A^3$. The recesses $A^7$ are so arranged that when a selecting position is reached the projection $C^3$ on the locking bolt C falls into a recess $A^7$ under the action of the spring $C^2$ and holds the selector in that position until lifted out of the recess by the cam $B^7$ prior to the next selecting movement. The arm $B^5$ also serves to operate through a link $B^8$ a check pawl $B^9$ cooperating with the second ratchet wheel $A^5$ on the selector spindle.

Thus when the solenoid B is energized, its armature pulls down the rod $B^2$ from the position shown in Figure 3 and operates the arm $B^5$, so that the cam $B^7$ lifts the locking bolt projection $C^3$ out of the recess A and the driving pawl $B^6$ comes into engagement with a tooth on the ratchet wheel $A^4$ and starts to drive the selector. This movement continues until it is arrested by the check pawl $B^9$, which has meanwhile been moved into the path of the tooth on its ratchet wheel $A^5$. At this stage the new selecting position has been reached and the locking bolt C falls until its projection $C^3$ arrives at the bottom of the next recess $A^7$. The parts now occupy the positions shown in Figure 4. When later the solenoid is deenergized in the manner referred to in connection with Figure 1, its armature resets itself and the cam $B^7$ raises the locking bolt C a short distance, the projection $C^3$ however still remaining in the recess $A^7$, the parts now having returned to the positions shown in Figure 3. The locking bolt C carries two contact arms $C^4$ $C^5$ which respectively bridge the gaps between pairs of fixed spring contact arms $C^6$ $C^7$, when the projection $C^3$ is in the bottom of a recess. These two sets of contacts correspond to the contacts 72, 73 of Figure 1 and serve for transmitting the release current to the control station.

The control station mechanism is shown in Figures 5–17 and is mounted behind an indicating panel D, of which a front view is shown on a reduced scale in Figure 5. The actual form of the indicating mechanism, which as mentioned in connection with Figure 1, is actuated by the positive and negative coils 203, 204 controlled by the polarized relay 200, may vary, but a simple form of indicating mechanism is included in Figures 5–9. In this arrangement the indicating panel D is provided with a series of windows $D^1$ grouped in a circle around the axis of the control station selector E, the spindle $E^1$ of which projects through the panel D and carries a pointer $E^2$. These windows $D^1$ correspond respectively to the substation controlled apparatus and a circularly arranged line representation $D^2$ of the circuits associated with such apparatus is drawn on the panel D adjacent to the windows $D^1$. Immediately behind the panel D are four discs F $F^1$ $F^2$ $F^3$ which constitute the indicating mechanism. The front disc F, a detached view of which is given in Figure 6, is mounted on the selector spindle $E^1$ and rotates therewith, this disc having a single hole $F^4$ behind the end of the pointer $E^2$ and coming opposite each window $D^1$ in turn as the selector rotates from position to position. The second disc $F^1$ (see Figure 7) is rotatably mounted on the spindle $E^1$ and has a series of holes $F^5$ normally behind the windows $D^1$. This disc $F^1$ is rocked in a clockwise direction by the positive coil $F^6$ (203 in Figure 1) through an angle corresponding to half the distance between consecutive windows $D^1$ to bring straight bar markings $F^7$ behind the windows $D^1$ or the word Telephone in the case of the window corresponding to the general alarm position. The positive coil $F^6$ is operated for instance when the selected substation circuit-breaker is closed and this disc $F^1$ gives an indication which is such that the bar $F^7$ completes the line diagram $D^2$. The third disc $F^2$ (see Figure 8) is also rotatably mounted on the selector spindle $E^1$ and is rocked in a counterclockwise direction by the negative coil $F^8$ (204 in Figure 1), this disc having holes $F^9$ normally behind the windows $D^1$ and straight bar markings $F^{10}$ each at right angles to the corresponding bar $F^7$ on the disc $F^2$, the words General alarm being exposed through the general alarm window. The negative coil $F^8$ is operated when a selected circuit-breaker is open and the markings $F^{10}$ consequently lie at right angles to the line diagram $D^2$ when they are exposed through the windows. The fourth disc $F^3$ is fixed and is provided solely as a background behind the windows $D^1$. Thus the movements of the selector E operate the disc F to mask all indications other than that associated with the selected apparatus and the indication of condition of such apparatus is given by the movement of one or other of the discs $F^1$ $F^2$.

The indicating panel D also carries such meters $D^3$ as may be required (one meter being indicated at 266 in Figure 1) and lamps $D^4$ (corresponding to the yellow, green and red lamps 284, 285, 286 of Figure 1), in addition to a selecting push G (230 of Figure 1), a meters push H (260), a trip push J (240), a close push K (250), a telephone L (278), a duty switch M (280) and a lock-out switch $M^1$ (211).

The construction of the actuating mechanism for the control station selector E will now be described, mainly with reference to Figures 9–15. The first motion solenoid N (235 of Figure 1), when energized in the manner described with reference to Figure 1, acts through a lever $N^1$ to pull a rod $N^2$ down against the action of a spring $N^3$. The rod $N^2$ carries a pin $N^4$ engaging in the slotted end of an arm $N^5$ rotatably mounted on the selector spindle $E^1$, this arm carrying a driving pawl $N^6$ which cooperates with a ratchet wheel $E^3$ on the selector spindle. The spindle $E^1$ also carries two other ratchet wheels $E^4$ $E^5$ and two discs $E^6$ $E^7$. One of the discs $E^6$ is provided with a series of recesses $E^8$, into which a projection $O^1$ on a locking bolt O drops under the action of a spring $O^2$ when the selector reaches its various operative positions, whilst the second disc $E^7$ is formed as a cam disc with which a roller $P^1$ on a contact rod P cooperates, the roller being pressed into engagement with the disc by a spring $P^2$. The shape of the cam disc $E^7$ is such that when the selector reaches its half-notch position, the roller $P^1$ drops suddenly to its innermost position, after which further movement of the selector into an operative position raises the roller $P^1$ to its outermost position. The locking bolt O carries a roller $O^5$ which cooperates with a cam $N^7$ carried by the arm $N^5$, and this arm also operates through a link $N^8$ two check pawls $N^9$ $N^{10}$ cooperating with the ratchet wheel $E^4$ on the selector spindle. The contact rod P carries a contact arm $P^3$ engaging with a pair of fixed spring contacts $P^4$ (these contacts corresponding to the contacts 227 of Figure 1), and the locking bolt O carries three contact arms $O^6$ $O^7$ $O^8$, the first two of which engage with fixed spring contacts $O^9$ $O^{10}$ (the contacts 223, 224, of Figure 1), whilst the third $O^8$ engages with one or other of two pairs of fixed spring contacts $O^{11}$ $O^{12}$ (respectively corresponding to the contacts 221 and 222 of Figure 1). The rod $N^2$ also carries at its upper end a collar $N^{11}$, which engages, when the solenoid N is energized, with a lever $N^{12}$ and causes a contact block $N^{14}$ on the lever to engage with fixed spring contacts $N^{13}$ (225 in Figure 1), these contacts normally being held open by a spring $N^{15}$.

The second motion solenoid Q (236 of Figure 1), when energized, acts through a lever $Q^1$ to lift a rod $Q^2$ against the action of a spring $Q^3$, this rod carrying a pin $Q^4$ which engages in the slotted end of an arm $Q^5$. This arm $Q^5$ carries a driving pawl $Q^6$ cooperating with the ratchet wheel $E^5$ on the selector spindle $E^1$, the arrangement being such that energization of the solenoid Q causes the pawl $Q^6$ to be brought into a position to engage with the appropriate ratchet tooth, the actual driving of the ratchet wheel $E^5$ taking place under the action of the spring when the solenoid is deenergized. The arm $Q^5$ also operates through a slot and pin connection $Q^7$ a contact rod $Q^8$ carrying a contact arm $Q^9$ cooperating with a pair of fixed spring contacts $Q^{10}$, these contacts corresponding to the contacts 226 of Figure 1, and being opened when the solenoid $Q$ is energized.

Thus when the first motion solenoid N is energized to move the two selectors from one position to the next (the parts being now in the positions shown in Figures 9, 11, 12) the movement of the rod $N^2$ causes the cam $N^7$ to lift the locking bolt projection $O^1$ out of the recess $E^8$, thus leaving the selector E free to be rotated, the locking bolt also operating its contacts. The check pawl $N^9$ is also brought into position to prevent the selector from making more than a half-notch movement. The driving pawl $N^6$ then engages with a tooth on the ratchet wheel $E^3$ and begins to rotate the selector, this causing the locking bolt O to be held in its raised position. The movement of the rod $N^2$ and its collar $N^{11}$ has meanwhile caused the lever $N^{12}$ to move down and close its contacts. When the first half-notch movement of the selector is completed the contact rod P operated by the cam disc $E^7$ falls, closing its contacts $P^3 P^4$. The mechanism has now assumed the position shown in Figures 13, 14, 15.

Meanwhile the current transmitted to the substation by the closing of the contacts $N^{13}$ $N^{14}$ (225 of Figure 1) causes the substation selector to perform its movement and to transmit the release current to allow the control station selector to perform its second half-notch movement. This release current energizes the second motion solenoid Q. The consequent upward movement of the rod $Q^2$ stores energy in the spring $Q^3$ and brings the driving pawl $Q^6$ into position to engage with the ratchet wheel $E^5$. When this upward movement is completed, the rod $Q^8$ opens its contacts $Q^9 Q^{10}$ and thus deenergizes the first motion solenoid N, whose mechanism resets itself, the second check pawl $N^{10}$ moving into the path of a tooth on the ratchet wheel $E^4$ to limit the second half-notch movement. The return movement of the rod $N^2$ allows the contacts $N^{13} N^{14}$ to open, thus deenergizing the substation polarized relay and allowing the substation selector mechanism to reset itself and break the release current circuit. This in turn deenergizes the second motion solenoid Q and the spring $Q^3$ drives the selector through its second half-notch movement. During this movement the contact rod P is raised by the cam disc $E^7$. When the second half-notch movement is completed, the locking bolt O falls; the mechanism now being back in the position illustrated in Figures 9, 11, 12 except that the selector has moved forward one position. The locking bolt O may, if desired, be also employed as a mechanical interlock for the indicator mechanism. It will be noticed that throughout this sequence of operations, contacts are only completed for an operation after the previous one has been satisfactorily completed. Thus if a fault occurs, say after the first half-notch movement has been completed, the apparatus will remain locked in an inoperative position. In this position the indicating disc F obscures all indication and it is not until the whole movement has been properly completed that the indicating mechanism is free to give the desired indication.

The arrangement of the selecting and executive pushes and their associated apparatus will now be described, more especially with reference to Figures 9, 10, 16, 17. As mentioned above there are in addition to the selecting push G, three executive pushes H J K, and there is also a fourth dummy push $L^1$ associated with the telephone instrument L. Thus the cable $L^2$ of the telephone passes through a hole in the panel D (against which the instrument L is normally held by means of a weight $L^3$ suspended on the cable $L^2$) and is wound round a drum $L^4$ mounted on a fixed screwthreaded bolt $L^5$, the arrangement being such that the act of pulling out the instrument causes the drum $L^4$ to rotate and travel along the bolt $L^5$. The drum is provided with a recess $L^6$ in its surface, with which one arm $L^7$ of a lever cooperates, the other lever arm $L^8$ acting on a collar $L^9$ on the dummy push $L^1$. Normally with the telephone instrument L resting against the panel D, the end of the lever arm $L^7$ lies in the recess $L^6$, but when the telephone is pulled out for use, the drum $L^4$ rotates and causes the lever $L^7 L^8$ to depress the dummy push $L^1$.

The five pushes are interlocked in various ways and for this purpose are arranged in line with one another. In the first place it is desirable to interlock the five pushes with one another in such a manner that when one push is depressed the other four are locked against operation. This is effected by means of five superimposed plates R having holes $R^1$ through which the push rods $G^1 H^1$ $L^1 J^1 K^1$ of the pushes pass. Each push rod has an enlargement $G^2$ ($H^2 L^{10} J^2 K^2$) which just fits the holes $R^1$ in the plates R, and when a push is depressed the enlargement enters the corresponding set of holes in the plates and moves one of the plates laterally (one hole being slightly offset for this purpose) until all the holes of the set are opposite to one another. The holes $R^1$ in the plates are so arranged that when any one push is depressed, every other push rod passes through at least one offset hole, so that it is impossible to depress any push if another is already depressed.

All the pushes (except the telephone dummy push $L^1$) are also interlocked with the duty switch M and the lock-out switch M¹ and for this purpose the four push rods G¹ H¹ J¹ K¹ are grooved as at G³ H³ J³ K³ for engagement with corresponding grooves R² in spring-controlled catches R³ on a locking bar R⁴ which is moved longitudinally by means of a lever R⁵ which is rocked by means of a lug M² on a disc M³ carried by the shaft of the duty switch M. The duty switch disc M³ has another lug M⁴ which rocks a lever M⁵ and releases a catch M⁶ from a recess M⁷ in a disc M⁸ on the shaft of the lock-out switch M¹. Thus operation of the duty switch M moves the locking bar R⁴ longitudinally and thus locks the four push rods G¹ H¹ J¹ K¹ in the positions they happen to be occupying at the moment, and also releases the catch M⁶ to leave the lock-out switch free to be operated, if desired. Operation of the lock-out switch, however, causes a spring latch M⁹ to enter a recess M¹⁰ in the disc M⁸, thus locking the switch against resetting. The latch M⁹ can only be released when access is obtained to the interior of the control panel, so that the lock-out switch can only be reset by a skilled engineer. The duty switch thus acts to cut the whole control system out of action temporarily, whilst the lock-out switch is only used for testing purposes or in the event of failure of the apparatus.

A further interlock is associated with the control station selector E, the arrangement being such that all the pushes are locked when the selector is in a half-notch position, and the mechanism used to give this interlock is also arranged to give another interlock, namely to lock one or more of the executive pushes against operation in all selector positions except those in which the desired operation can be performed. Thus for instance the meters push H will be locked in all selector positions except those in which metering circuits are available, and the telephone dummy push L¹ will be locked in all except the general alarm position.

These two interlocks are obtained by means of five cam discs G⁴ H⁴ L¹¹ J⁴ K⁴ having suitably disposed recesses in their circumferences, which cooperate with collars G⁵ H⁵ L¹² J⁵ K⁵ on the push rods. The five cam discs are driven through gearing E⁸ from the selector spindle E¹ so that they all take up positions corresponding to the selector positions. The cam disc G⁴ opposite the selecting push G has recesses G⁶ corresponding to all the twelve selector positions; the cam disc H⁴ opposite the meters push H has recesses H⁶ in positions corresponding to the metering positions of the selector; the cam disc L¹¹ opposite the telephone dummy push L¹ has only one recess L¹³ in the general alarm position; the cam discs J⁴ K⁴ opposite the trip and close pushes J K have recesses J⁶ K⁶ in selector positions associated with circuit-breakers or switches. Each push can only be depressed when a recess such as G⁶ lies in the path of the collar (G⁵) on the push rod. In the half-notch positions there are no recesses and all the pushes are therefore locked against operation. In any one selected position the selecting push and one of the executive pushes are free to be depressed. If now the selecting push be depressed, it will lock all the other pushes against operation and will then cause the selector mechanism to drive the selector to the half-notch position. It will be appreciated that while the selecting push is depressed its cam disc G⁴ cannot rotate with the selector. This disc therefore instead of being driven directly by the gearing E⁸ is driven through a spring G⁷. When the selecting push is released, the disc G⁴ springs round to the half-notch position (a stop G⁸ carried by the gearing engaging in a slot G⁹ in the disc to ensure the correct movement of the disc). All the pushes are now locked until the selector has performed its second half-notch movement, when the selecting push and the appropriate executive push will be left free to be depressed. If an executive push is depressed, the selecting push remains locked until the executive push is again released. The cam discs J⁴ K⁴ have corresponding recesses and consequently both the trip push J and the close push K would be free to be depressed in certain positions. It is desirable to provide an interlock such that the trip push J is locked against operation when the selected circuit-breaker is open and the close push K is similarly locked when the circuit-breaker is closed. This interlock is conveniently obtained from the indicating mechanism, which will have given its indication as soon as the selected position is established. For this purpose the trip and close pushes are provided with collars J⁷ K⁷, in whose paths the ends of levers J⁸ K⁸ are interposed by the indicating discs F¹ F². Thus when the selected circuit-breaker is closed the disc F¹ will be rocked and this will move the lever K⁸ to obstruct the path of the collar K⁷ and prevent depression of the close push K, movement of the disc F² when the circuit-breaker is open similarly moving the lever J⁸ to lock the trip push J.

The contacts of the pushes may conveniently be disposed beneath the selector actuating mechanism as indicated for example at G¹⁰ H⁷ L¹⁴ J⁹ K⁹. It will be remembered from the description of Figure 1 that the meters push has a specially arranged set of contacts (indicated at 262 in Figure 1) which are closed to complete the metering circuit when the push is depressed, but are not opened again until the next movement of the selector. For this purpose the meters push rod H¹ is extended so that, when the push is depressed, it will abut against a pivoted contact arm H⁸ and move it against the action of a spring H⁹ into engagement with a spring contact H¹⁰, the arm H⁸ being held in this position by a spring catch H¹¹. This spring catch H¹¹ is connected by a link H¹² and a lever H¹³ to a roller H¹⁴ which engages with a cam disc E⁹ on the selector E (see Figure 10), this disc having recesses E¹⁰ in positions corresponding to the metering positions. Thus when the selector moves into a metering position the roller H¹⁴ enters the recess E¹⁰ and the catch H¹¹ moves down into a position in which it will hold the contact arm H⁸ when the meters push has been depressed. A new selecting movement will cause the disc E⁹ to push the roller H¹⁴ out and thus release the contact arm H⁸.

Figure 18 shows an alternative arrangement for performing the tripping and closing operations, instead of arranging that the two pushes transmit identical currents over the pilot wires. In this drawing the same reference numerals are employed as in Figure 1 for corresponding parts, and the arrangement will be described only in so far as it differs from the arrangement of Figure 1. At the control station end the only difference is that the trip push 240 when depressed inserts resistances 245, 246 in the executive circuit over the pilot wires 41, 42 so that for tripping purposes the magnitude of the executive current is less than for closing purposes. At the substation a further relay 143 is provided in series with the polarized relay 140 to respond only when the greater current is received for circuit-breaker closing purposes. In this case it is unnecessary to provide a special trip relay, contacts 156 on the executive relay 150, which are in series with interlock contacts 144 and 149 respectively on the relay 143 and on a close relay 146, acting directly to energize the tripping busbar 167. Further contacts 145 on the relay control the circuit to the close relay 146, this circuit including the close relay busbar 166, as in Figure 1. The close relay 146 makes its own retaining circuit at contacts 147 to render it independent of the relay 143 and at contacts 148 it energizes the closing busbar 168. The operation of this modification will be apparent without further description.

Figures 19–23 illustrates some alternative arrangements for obtaining "express" selection to which reference was made above in connection with Figure 1. It will be remembered that in the step-by-step selecting arrangement described for Figure 1, depression of the selecting push 230 breaks the circuit to the second motion solenoid 236 at contacts 233 and makes the circuit to the first motion solenoid at contacts 232, and it will be appreciated that all that is necessary to obtain the desired express selection is to arrange that both circuits are simultaneously completed, the resetting movement of the second motion solenoid (or alternatively the reception of an indicating signal) then automatically causing the re-energization of the first motion solenoid. Various alternative arrangements may be employed to enable either step-by-step or express selection to be obtained as desired.

Figure 19:
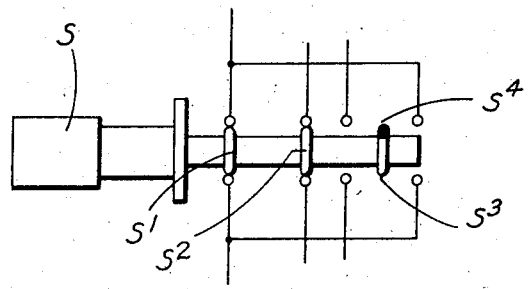
Figure 20:
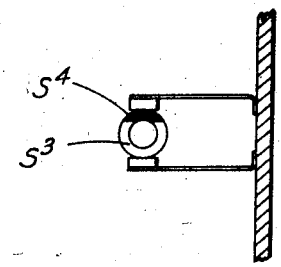

In the arrangement of Figures 19 and 20 the selecting push S can be either depressed for step-by-step selection or depressed and rotated for express selection. For this purpose the push rod carries three contact discs S¹ S² S³, part of the third disc S³ being insulated at S⁴. In the normal position the discs S¹ S² make contacts corresponding to the contacts 233 and 231 of Figure 1. When the push S is depressed, these contacts are broken and the disc S² makes contacts corresponding to the contacts 232 of Figure 1. This will give step-by-step selection as in Figure 1. Depression and rotation of the push S however will cause the disc S² to make its contacts (232) as before and will also cause the disc S³ to make contacts equivalent to the contacts 233 of Figure 1, thus producing the desired express selection.

Figure 21:
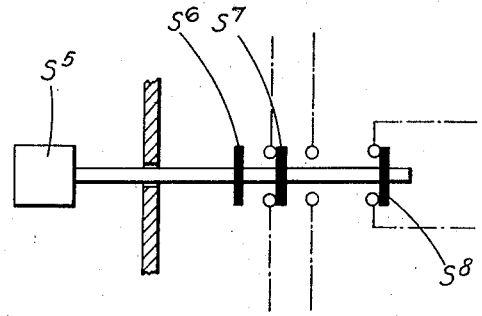

Figure 21 shows an alternative in which depression and quick release of the push gives step-by-step selection and continued depression gives express selection. The push S⁵ has three contact arms S⁶ S⁷ S⁸, of which the third S⁸ controls contacts corresponding to the contacts 231 as in Figure 1. The second arm S⁷ normally makes contacts corresponding to 233 and on depression of the push makes contacts corresponding to 232. The first arm S⁶ makes contacts corresponding to 233 when the push is depressed, but this has no operative effect if the push is released before the release current arrives from the substation to energize the second motion solenoid.

Figure 22:
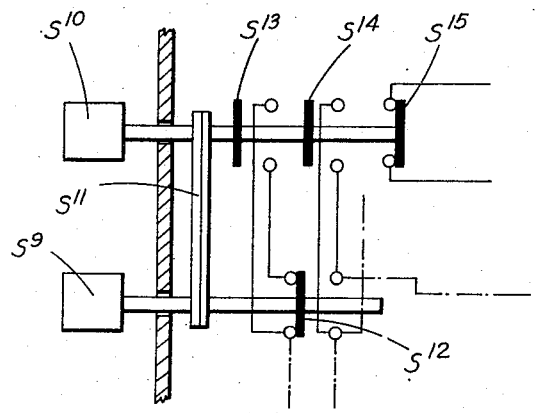

Figure 22 shows an alternative employing two separate pushes S⁹ S¹⁰ mechanically interlocked by plates S¹¹ generally similar to the interlocking plates R shown in Figure 17. In this case the push S⁹ for step-by-step selection has a single contact arm S¹² normally closing contacts corresponding to 233 and on depression closing contacts corresponding to 232, the indicating circuit contacts being in this case left closed for step-by-step selection. The express selecting push S¹⁰ has three contact arms S¹³, S¹⁴, S¹⁵, and when it is held depressed the arm S¹⁵ breaks the indicating circuit whilst the other two arms complete the express selection contacts.

Figure 23:
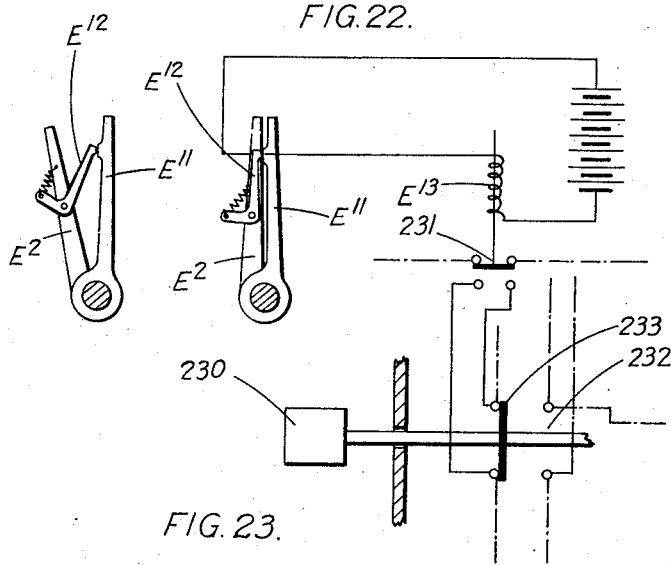

Figure 23 shows an arrangement in which the selector pointer E² is used for contact-operation for express selection purposes, a barometer finger E¹¹ being provided, i. e. an idle pointer which can be moved by hand to a selected position in advance of the selector pointer E². For this purpose the selector pointer E² is provided with a spring-controlled contact arm $E^{12}$ which engages with the barometer finger $E^{11}$ when the latter is adjacent to the selector pointer or is one selecting position in advance thereof. Such engagement energizes a relay $E^{13}$ to close contacts corresponding to the contacts 231 of Figure 1. When the pointers are apart, the relay $E^{13}$ is deenergized and closes contacts corresponding to 233 of Figure 1. The selecting push is arranged exactly in the manner of the push 230 of Figure 1 except that it no longer controls contacts 231. Thus for step-by-step selection the pointers are together and the selecting push is used in the ordinary manner, but for express selection the barometer finger $E^{11}$ is moved round to the selecting position chosen and the selecting push is held depressed. When the position immediately before the chosen position is reached the relay $E^{13}$ is energized and the remaining selecting movement is performed as for step-by-step selection.

Express selection can also be obtained in a variety of ways if each selecting position is provided with its own express selection push. One such example is illustrated in Figures 24 and 25, wherein a common selecting push is arranged in exactly the same manner as the push 230 of Figure 1 except for the omission of the contacts 231, whilst each selecting position has its own express selection push $S^{16}$ which when depressed closes contacts corresponding to 233 of Figure 1. Each push $S^{16}$ when depressed is automatically held depressed by a catch $S^{17}$ which falls in the path of a collar $S^{18}$ on the push rod, this catch being lifted by an arm $E^{14}$ on the selector when the selected position is reached.

Figure 26 shows a modification of the arrangement of Figure 1 relating to the general alarm arrangements. In some circumstances, when the indicating mechanism at the control station is of the self-recording type, it is preferable to arrange that the reception of a general alarm signal at the control station will automatically cause the selectors to perform a complete selecting and indicating cycle, so that when the operator arrives to attend to the general alarm signal he will be able to see at once what changes have taken place to cause the general alarm, without first having to proceed right through a selecting cycle. This may be effected, as in Figure 26 (which shows part of the control station circuits, reference numerals similar to those of Figure 1 being employed where applicable), by the provision at the control station of a general alarm relay 300, whose energizing circuit is controlled by contacts 294 on the general alarm position relay 290 and by the contacts 208 of the negative coil 204 (the contacts 208 no longer directly controlling the circuit to the red lamp 286 and the buzzer 287). The general alarm relay 300 makes its own retaining circuit at contacts 301, this circuit being taken through selector contacts 305 which are closed in the first few (say four) selector positions. The relay 300 also closes three other sets of contacts 302, 303, 304, the first two of which bridge the selecting push contacts 233 and 232 and consequently initiate an express selecting and indicating cycle, whilst the third 304 energizes an auxiliary alarm relay 310 which closes four sets of contacts 311, 312, 313, 314. The contacts 311 control a retaining circuit for the relay which is taken either through selector contacts 306 closed in all positions except the general alarm position or through normally closed additional contacts 234 on the selecting push 230 and the contacts 316 of a stop bell push 315. The contacts 312 control a circuit to the red lamp 286 and the buzzer 287, whilst the contacts 313, 314 serve to prepare further bridging connections for the express selection contacts 233, 232 of the selecting push 230. These further bridging connections are completed by contacts 321, 322 on a contact rod 320 operated by a cam 323 on the selector, the shape of the cam being such that the contacts 321, 322 are closed when the third selected position is reached and remain closed until shortly before the last half-notch position immediately preceding the general alarm position.

Thus when a general alarm signal is received the general alarm relay 300 will initiate an express selecting and indicating cycle by closing its contacts 302, 303 and will also at contacts 304 energize the auxiliary alarm relay 310 to cause the buzzer 287 to sound. When the general alarm relay 300 is deenergized by the breaking of its retaining circuit at contacts 305 after the fourth selecting position has been passed, the auxiliary alarm relay 310 will cause the cycle to continue (owing to the alternative bridging connections through contacts 313, 314, 321, 322) until the zero position is again reached. The cycle will then stop owing to the opening of the contacts 321, 322 by the cam 323, but the auxiliary alarm relay 310 will remain energized and thus keep the buzzer sounding until the operator arrives. The auxiliary alarm relay is deenergized to stop the alarm, when the operator depresses either the stop bell push 315 or the selecting push 230, depression of the latter causing a new step-by-step cycle to be commenced. This arrangement also enables the operator to obtain a check of the condition of the substation apparatus at any time in a simple manner, since all that is necessary is for him to energize the general alarm relay 300, for example by means of a special hand-push (not shown). This relay will then function in the manner just described to cause a complete selecting and indicating cycle to be performed.

Figure 27 shows another modification of the general alarm arrangements of Figure 1 (which will only be described in so far as it differs from Figure 1, the reference numerals of Figure 1 being employed where applicable), the main purpose of this modification being to provide means whereby a general alarm can be given at the control station during the time when a meter reading is being taken in a selected position. The substation general alarm relay 190 in this case is arranged in the same manner as in Figure 1 except that it is provided with an extra set of contacts 193 which control the circuit to an auxiliary alarm relay 330 and that its retaining circuit through its contacts 192 and the selector contacts 83 is also controlled by contacts 341 on a definite time limit relay 340. This time limit relay 340 is controlled by contacts 331 on the auxiliary alarm relay 330, which also has contacts 332, 333, 334 which break the three pilot wire circuits and contacts 335, 336 which connect the pilot wires 41, 42 across the substation battery 120. The auxiliary alarm relay 330 is also controlled by contacts 351 on a meters relay 350, energized through extra contacts 157 on the executive relay 150 and through selector contacts such as 115 closed only in metering positions. Contacts 352 on the meters relay 350 complete the retaining circuit for the executive relay 150, whilst the remaining contacts 353 on this relay complete the circuit from the pilot wire 40 through extra contacts 135 on the selector relay 130 to the metering busbar 162.

At the control station end the meters push 260 has further contacts 267, 268, of which the first 267 are arranged in the same manner as the contacts 262 but control the pilot wire 41, whilst the contacts 268 control the circuit to an alarm relay 360 through the contacts 366 of a stop bell push 365. This circuit when completed runs from substation battery 120 through contacts 122, 335, 125, pilot wire 41, contacts 215, 267, 268, relay 360, contacts 366, 261, 251, 241, 216, pilot wire 42, and contacts 126, 336, 121 to battery 210. The alarm relay 360 has retaining contacts 361 and also contacts 362 controlling a direct circuit to the control station buzzer 287.

With this arrangement it will be clear that the normal general alarm process is not interfered with, and the devices described are only operative when metering is actually in progress. Thus when the meters push 260 is depressed, it operates the substation executive relay 150 in the manner described with reference to Figure 1 but in this case it also operates the contacts 267 so that when the meters push is released to establish the metering circuit, a circuit is prepared over the pilot wires 41, 42 through the contacts 267 and 268 to the control station alarm relay 360. At the substation end the executive relay 150 does not itself establish the metering circuit but energizes the separate meters relay 350 to do so. If now, some change occurs in the substation apparatus which causes the general alarm relay 190 to be energized, this relay at once energizes the auxiliary alarm relay 330, as a result of which the alarm relay 330, metering circuit is broken at contacts 332, 334 and a current is transmitted over the pilot wires 41, 42 to energize the alarm relay 360 and thus operate the control station buzzer. The auxiliary alarm relay 330 also completes the circuit to the time limit relay 340, which opens its contacts 341 after its time delay (which may be say three or four seconds) and thus breaks the retaining circuit to the general alarm relay 190, this relay in turn deenergizing the auxiliary alarm relay 330 to reestablish the metering circuit.

The second arrangement, illustrated in Figures 28–31 and now to be described, differs from the first mainly as regards the mechanical construction of the apparatus used and the manner in which the various currents are transmitted over the pilot wires between the two stations. The transmission of these currents from each station to the other is controlled by a special multi-way switch which will first be described.

In a preferred form illustrated in Figure 29, this transmitting switch comprises a longitudinally movable contact member T, which normally occupies a central position but can be moved therefrom in one direction or the other into an operative position, this movement being brought about electromagnetically by means of one or other of two coils $T^1$ $T^2$. The contact member T is provided with a slot $T^3$ of generally triangular shape, a central projection $T^4$ being provided in the base of the triangle so that a recess $T^5$ or $T^6$ is left at either end thereof. Cooperating with the contact member T is a transversely movable locking member $T^7$ having a catch $T^8$ which is normally pressed by a spring against the projection $T^4$ and can be electromagnetically moved away from the base of the triangle by a release coil $T^9$. Thus when one of the two operating coils $T^1$ $T^2$ is energized, the member T moves into an operative position in which it is locked by the catch $T^8$ entering one of the recesses $T^5$ $T^6$. Energization of the release coil $T^9$ will cause the catch $T^8$ to ride along the sloping side of the slot $T^3$ and thus centralize the contact member T, the catch $T^8$ returning to its normal position when the release coil $T^9$ is deenergized. The contact member T operates a set of contacts $T^{11}$ closed only in the central position and also two sets of change-over contacts $T^{12}$ $T^{13}$, whilst the locking member $T^7$ operates normally closed contacts $T^{10}$.

The transmitting switch illustrated in Figure 29 is utilized at the control station for transmitting selecting and executive currents to the substation and is indicated diagrammatically in Figure 28. Thus the selecting and executive coils T¹ T² are indicated at 400, 410 and the release coil T⁰ at 420. The energizing circuits of the coils 400, 410 are respectively controlled by the contacts 401, 411 on selecting and executive pushes 402, 412 and also by the release coil contacts 421 (corresponding to the contacts T¹⁰ of Figure 29). The two pushes have further normally closed contacts 403, 413 in the energizing circuit of the release coil 420. The selecting and executive coils are each shown as controlling three sets of contacts 404, 405, 406 and 414, 415, 416, of which the contacts 404 and 414 together correspond to the contacts T¹¹ of Figure 29, the contacts 405 and 415 to the contacts T¹² and the contacts 406 and 416 to the contacts T¹³. The contacts 405, 406 control a connection from the control station battery 425 to the first two of the three pilot wires 426, 427, 428 leading to the substation for the purpose of transmitting selecting currents, and the contacts 415, 416 make a similar connection for the purpose of transmitting executive currents, such currents however being of opposite polarity to the selecting currents. A generally similar transmitting switch is provided at the substation for transmitting "positive" or "negative" indicating currents in accordance with the condition of the selected substation apparatus. This switch has a positive coil 500 and a negative coil 510, which by their contacts 501, 502, 511, 512 control the transmission from the substation battery 525 of indicating currents of one or the other polarity over the pilot wires 427, 428 to the control station. The substation transmitting switch has a release coil indicated at 520 without, however, any contacts associated with it, and is also provided with further contacts indicated at 503, 513 whose functions will be referred to later, and also contacts 505, 506 which are closed when the switch is in its central position and control a metering circuit over the pilot wires 426, 428, this circuit being controlled at the control station end by the contacts 404, 414, so that metering is available in each selected position (when no other function is being performed) and it is unnecessary to provide a special meters push as in the first arrangement above described.

Between each transmitting switch and the pilot wires is a pilot selector relay controlling the connection of the pilot wires to the appropriate control station or substation apparatus. The control station pilot selector relay comprises a member 430 which can be moved from a normal central position (in which it is held by a centralizing spring 431) in one direction or the other by two coils 432, 433. The member 430 carries three contact arms 436, 437, 438 respectively connected to the three pilot wires 426, 427, 428 and cooperating with sets of segmental contacts, and is also provided with contacts 434, 435 controlling the connections to the battery 425. This member 430 is also movable by hand-operated means indicated at 439 into an inoperative position wherein the pilot wires and battery are disconnected from the apparatus for lock-out purposes. The contact arm 436 in its central position engages with fixed contacts 440, 441, 442, movement of the member 430 to the left by the coil 432 causing the arm 436 to move out of engagement with the contact 442, but to remain in engagement with the contacts 440 and 441. When the member 430 is moved to the right by the energization of the coil 433, the contact arm 436 engages only with a contact 443. The contact arm 437 engages in its central and left positions with a contact 444 and in its right position with a contact 445. The contact arm 438 engages in its central position with contacts 446, 447, in its left position with a contact 448 and in its right position with contacts 446, 449. The coil 432 is connected between the pilot wire 427 and the contact 440, and the coil 433 between the pilot wire 427 and the contact 446. The contacts 442, 447 control the metering circuit and the contacts 441, 444 are connected to the selecting and executive contacts 405, 406, 415, 416. The contact 441 is also used with the contact 448 to connect the release coil 420 to the pilot wires 426, 428. The contacts 445, 449 are connected to a polarized relay 450 which receives the indicating currents and the contact 449 is also used with the contact 443 to convey current from the indicating apparatus to the substation release coil 520.

The substation pilot selector relay is constructed in a similar manner and comprises a member 530 which is operated by two coils 532, 533 against the action of a centralizing spring 531 and carries contacts 534, 535 controlling the connections to the substation battery 525 in addition to three contact arms 536, 537, 538 respectively connected to the three pilot wires 426, 427, 428, the member 530 also being movable by hand-operated means 539 into an inoperative position for lock-out purposes. The contact arm 538 in its central position engages with fixed contacts 540, 541, 542, the connection to the contact 542 being broken when the member 530 is moved to the right under the action of the coil 533. When the member 530 is moved to the left by the coil 532, the arm 538 engages only with a contact 543. The contact arm 537 engages in its central and right positions with a contact 544 and in its left position with a contact 545. The contact arm 536 engages in its central position with contacts 546, 547, in its right position with a contact 548 and in its left position with contacts 546, 549. The coil 532 is connected between the pilot wire 427 and the contact 546, whilst the coil 533 is connected between the same pilot wire and the contact 540. The contacts 542, 547 control the metering circuit and the contacts 541, 544 are connected to the positive and negative indicating contacts 501, 502, 511, 512. The release coil 520 is connected between the contacts 544, 548, and the contacts 543, 549 control the circuit to the control station release coil 420, whilst the contacts 545, 549 are connected to a polarized relay 550 which receives the selecting and executive currents.

Thus if the control station transmitting switch is operated to send a selecting or executive current over the pilot wires 426, 427, the pilot selector relay coils 432, 532 will be energized and will move their contact members 430, 530 to the left to complete a circuit from the control station battery through the contacts 405, 406 (or 415, 416) and the contacts 441, 444 over the pilot wires 426, 427 and through the contacts 549, 545 to the substation polarized relay 550, and another circuit will be prepared through the contacts 549, 543, the pilot wires 426, 428 and the contacts 441, 448 to the control station release coil 420, the substation transmitting switch and the control station polarized relay being at the same time cut off from the pilot wires. In a similar manner when an indicating current is to be transmitted from the sub-station, the pilot selector relay coils 433, 533 will operate those relays to complete the necessary circuits and to cut off the selecting and executive circuits.

The movement of the contact member T (see Figure 29) of the control station transmitting switch is also utilized to operate the actuating mechanism for the control station selector (the spindle of which is shown at U), and for this purpose the member T is provided with a projection $T^{14}$, which when the selecting coil $T^1$ is energized abuts against one arm $U^1$ of a spring-controlled operating lever. Energization of the executive coil $T^2$ will cause the projection $T^{14}$ to move away from the lever arm $U^1$ which remains unaffected. The other arm $U^2$ of the lever is connected to a plate $U^3$ which carries two stops $U^4$ $U^5$ cooperating with a ratchet wheel $U^6$ on the selector spindle U and also two spring-controlled pawls $U^7$ $U^8$ cooperating with an oppositely disposed ratchet wheel $U^9$ on the spindle U. The two stops $U^4$ $U^5$ respectively engage with the top and bottom of their ratchet wheel $U^6$, whilst the two pawls $U^7$ $U^8$ engage with opposite sides of the ratchet wheel $U^9$, so that upward movement of the plate $U^3$ due to the energization of the selecting coil $T^1$ will cause the pawl $U^8$ to drive the selector forward to an extent limited by the stop $U^5$ which is moved into the path of a tooth on the ratchet wheel $U^6$. This is the first half-notch movement, and when it is completed the selector remains locked by the pawl $U^8$ and the stop $U^5$ (since the contact member T is locked in its operative position) until the plate $U^3$ moves back again to its normal position. This return movement of the plate $U^3$ takes place when the contact member T is centralized by the energization of the release coil $T^9$, and causes the pawl $U^7$ to drive the selector through its second half-notch movement, this movement being limited by the interposition of the stop $U^4$ into the path of a tooth on the ratchet wheel $U^6$.

Thus to effect a selecting movement, the selecting push 402 is depressed to energize the selecting coil 400 ($T^1$). The contact member T of the transmitting switch then moves into its selecting position, in which it is locked by the engagement of the projection $T^8$ on the locking member $T^7$ in the recess $T^6$, the movement of the locking member opening the contacts $T^{10}$ (421) and breaking the circuit to the selecting coil 400. The movement of the contact member T has meanwhile caused the control station selector to perform its first half-notch movement and has at contacts 405, 406 transmitted a selecting current over the pilot wires 426, 427, this current owing to the operation of the pilot selector relays passing to the substation polarized relay 550 over a circuit which may be traced from battery 425 through contacts 434, 405, 441, 436, pilot wire 426, contacts 536, 549, polarized relay 550, contacts 545, 537, pilot wire 427, and contacts 437, 444, 406, 435 to battery 425.

This polarized relay 550, when energized in the selecting direction, closes contacts 551, and thus energizes from the substation battery 525 one coil, the "start" coil 560, of what may be termed a selecting shuttle switch, which also has a second operating coil, the "stop" coil 561, and eight sets of contacts 562–569. The energizing circuit for the start coil 560 may be traced from battery 525 through contacts 534, 576, coil 560, and contacts 569, 551, 535 to battery 525. The movement of the shuttle switch from its normal central position, when the start coil 560 is energized, opens the contacts 562, 564 and closes the contacts 563, 565, leaving the other contacts unaffected. The closing of the contacts 563, 565 energizes the two coils 570, 571 of the selector actuating magnet, whose armature 572 drives the selector through suitable ratchet mechanism (diagrammatically indicated at 573) into its next selected position. The armature 572 also serves for contact operation, and at its first movement opens contacts 574 and closes contacts 575 in a retaining circuit through the shuttle switch contacts 567 for one of the two magnet coils 570. Towards the end of its movement the armature 572 at contacts 576 breaks the circuit to the start coil 560 of the shuttle switch which centralizes itself under the action of springs (not shown), thus deenergizing at contacts 565 the second magnet coil 571, the coil 570 alone, however, being capable of exerting the force necessary to complete the armature movement. When this movement is completed contacts 577 are closed to energize the stop coil 561 of the shuttle switch (over a circuit from battery 525 through contacts 534, 577, coil 561, and contacts 563, 551, 535 to battery 525), which thereupon moves in the opposite direction to open contacts 567, 569 and to close contacts 566, 568. The closing of contacts 566 completes a retaining circuit for the stop coil 561 and the opening of the contacts 567 breaks the retaining circuit to the magnet coil 570, so that the armature 572 resets itself and closes the contacts 574. These contacts 574 together with the contacts 568 of the shuttle switch prepare a circuit through the substation pilot selector relay contacts 549, 543, the pilot wires 426, 428 and the control station pilot selector relay contacts 441, 448 for the control station release coil 420, this circuit being taken from the control station battery 425 through the selecting contacts 405, 406 on the transmitting switch and also through the interlock contacts 403, 413 on the slecting and executive pushes 402, 412. Provided, therefore, that the selecting push 402 has meanwhile been released, the release coil 420 is energized and causes the locking member to centralize the transmitting switch. Besides causing the control station selector to perform its second half-notch movement, this breaks the transmitting circuit at contacts 405, 406 and thus allows the substation polarized relay, the selecting shuttle switch and the two pilot selector relays to return to their normal positions. The de-energization of the release coil 420 then brings the transmitting apparatus at the control station back to its normal condition.

The substation selector, as in the first arrangement has groups of contacts associated with the controlled apparatus, but these contacts are arranged in a somewhat different manner to control different circuits. Thus in its normal zero position utilized for general alarm and telephone calling purposes the selector operates contacts 580—584, whilst groups of contacts 590—595, 600—605, 610—612 are operated in the second, third and fourth positions respectively, the second and third positions being associated primarily for example with circuit-breakers 620 whilst the fourth position is associated with a thermostat 630. As has been mentioned above, metering circuits are in this arrangement also available in all selector positions. Thus the general alarm position may be used for obtaining meter readings of the busbar voltage derived from a potential transformer indicated at 641. In the second position the metering circuit may be used for telephone speaking, the telephone being indicated at 642, whilst the remaining positions may be used for various metering circuits derived for example from transformers such as 643, 644, these metering circuits being controlled by selector contacts 584, 595, 605, 612 closed only in the appropriate selector positions. Each circuit-breaker 620 has a closing coil 621 and a trip coil 622 controlled by selector contacts such as 590, 591 or 600, 601, the latter contacts 591, 601 also controlling the circuits through auxiliary change-over switches 623 to close relay and trip relay busbars 650, 651, the closing coils and trip coils also being connected to busbars 652, 653. Further auxiliary change-over switches 624 associated with selector contacts such as 592, 602 are connected to executive release busbars 654, 655, 656, whilst auxiliary change-over switches 625 in series with selector contacts such as 593, 603 are connected to indicating busbars 657, 658 as also are change-over contacts 632 on the thermostat relay 631. Each circuit-breaker is also provided with a flick switch 626 in series with selector contacts 594 or 604, such flick switches and a corresponding set of contacts 633 on the thermostat relay controlling a general alarm busbar 659 in circuit with a general alarm relay 660 which is provided with retaining contacts 661 in series with the selector contacts 583 and with operating contacts 662 controlling the indicating circuit, the general alarm arrangements being generally similar to those of Figure 1. For telephone calling from the substation a push 663 (having an electromagnetic locking device 664 energized through the selector contacts 580) is provided, its change-over contacts 665 in series with the selector contacts 581 acting to control the indicating circuit. The circuit to the telephone bell 666 and to a red lamp 667 is controlled by the selector contacts 582.

Thus when a selecting movement has been performed in the manner described above, the appropriate selector contacts 593 or 603 or 610 close, and energize one or other of the two indicating busbars 657, 658 in accordance with the condition of the selected apparatus, these busbars being connected through interlock contacts 503, 513 to the negative and positive coils 510, 500 of the substation transmitting switch, which thereupon operates its contacts 501, 502 or 511, 512 to transmit a current of one polarity or the other over the pilot wires 427, 428. This current energizes the pilot selector relay coils 433, 533, and is consequently passed on to the control station polarized relay 450. The energizing circuit for the polarized relay 450 may be traced (assuming say the negative coil 510 to have been energized) from the substation battery 525 through contacts 534, 511, 541, 538, pilot wire 428, contacts 438, 449, polarized relay 450, contacts 445, 437, pilot wire 427, and contacts 537, 544, 512, 535 to battery 525. This relay 450 operates one or other of its sets of contacts 451, 452 to energize either the positive coil 460 or the negative coil 465 of the indicating mechanism. These coils control contacts 461—464 and 466—469, of which the contacts 461, 466 are connected in parallel across the pilot selector relay contacts 443, 449 to transmit a current over the pilot wires 426, 428 for the operation of the substation release coil 520 (this circuit being traced from substation battery 525 through contacts 534, 511, 541, 538, pilot wire 428, contacts 438, 449, 461 or 466, 443, 436, pilot wire 426, contacts 536, 548, release coil 520 and contacts 512, 535 to battery 525), whereupon the substation transmitting switch resets itself and deenergizes the control station polarized relay 450 and the pilot selector relays.

The interlock contacts 503, 513 above referred to on the substation transmitting switch are provided to prevent the immediate repetition of the indicating signal (which would otherwise occur since the primary indicating circuit is still complete), and their arrangement will be clear from Figure 30 which illustrates the transmitting switch, and will now be described. The general arrangement of this switch is similar to that of the control station transmitting switch and comprises a contact member V movable longitudinally under the action of the positive and negative coils $V^1$ $V^2$ (500, 510 in Figure 28) and carrying contact arms $V^3$ $V^4$ controlling contacts (505, 506) in the metering circuit and contact arms $V^5$ $V^6$ controlling contacts (501, 502, 511, 512) in the indicating circuit. This contact member V is locked in its operative positions by the transversely-movable locking member $V^7$ operated by the release coil $V^8$ (520) in a manner exactly similar to that described with reference to Figure 29 for the control station switch. This switch is, however, provided with an auxiliary contact slide $V^9$ operating contacts $V^{10}$ $V^{11}$ corresponding to the interlock contacts 503, 513. This slide $V^9$ has projections $V^{12}$ $V^{13}$ cooperating with a projection $V^{14}$ on the contact member V, so that when the contact member is moved under the action of, say, the positive coil $V^1$ and is locked in its operative position, the slide $V^9$ moves to open the contacts $V^{11}$ (513) and break the circuit to the positive coil $V^1$ (500) but still leaves the contacts $V^{10}$ (503) closed to allow of the energization of the negative coil $V^2$ (510), the slide $V^9$ remaining in this position when the contact member V is centralized. Thus although the transmitting switch cannot repeat its positive signal, it is still ready for operation to transmit a negative signal, if required, after which, of course, the slide $V^9$ would be in a position to prevent the repetition of a negative signal whilst allowing a positive signal to be transmitted. The slide $V^9$ is centralized each time the selector makes a selecting movement by suitable mechanism, such for example as the three-armed lever $V^{15}$ and the star wheel $V^{16}$ on the selector spindle illustrated in the drawings.

When the indication of the condition of the selected apparatus has been given, the operator at the control station is free, if he wishes to do so, to initiate an executive function, for example to close the selected circuit-breaker if it is open. In Figure 28 a single executive push 412 is shown for simplicity, but it will be appreciated that separate mechanically interlocked pushes are preferably employed as in the first arrangement (except for the omission of a meters push which is unnecessary in the present arrangement). If the appropriate executive push is depressed, the executive coil 410 of the transmitting switch will be operated, and this will cause the operation of the pilot selector relays and then of the substation polarized relay 550, this relay, however, now being operated in the executive direction to close its contacts 552, 553. The latter contacts 553 are in circuit with the telephone bell 666 and the red lamp 667, this circuit however being controlled by the selector contacts 582 which are closed only in the general alarm position. The contacts 552 control the circuits to trip and close relays 670, 680. The energizing circuit to the trip relay 670 is taken through interlock contacts 681 on the close relay 680 to the trip relay busbar 651, and is only completed when the selected circuit-breaker is closed. The circuit to the close relay 680 similarly includes interlock contacts 671 on the trip relay and the close relay busbar 650. These relays each make their own retaining circuit at contacts 672 or 682, and respectively operate contacts 673, 683 to energize the tripping and closing busbars 653, 652. Each relay also closes contacts 674 or 684 to complete a circuit through the appropriate executive release busbar 654 or 655, the circuit-breaker auxiliary switch 624, the selector contacts 592 and the executive release busbar 656 to the pilot selector relay contacts 543, 549 and thence over the pilot wires 426, 428 to the control station release coil 420 which resets the control station transmitting switch (provided that the executive push 412 has meanwhile been released). This brings the apparatus back again to the normal condition and a new indicating function will be performed to indicate the change in condition of the circuit-breaker.

The return of the apparatus to its normal condition after the desired indication has been given, either immediately after selection or after the performance of an executive function reestablishes the metering circuit. This circuit is taken from the selected metering source such as 641 or 643 or 644; through metering busbars 645, 646 and through the substation transmitting switch contacts 506, 505 (which are closed whenever the switch is in its normal central position) to the pilot selector relay contacts 547, 542 and thence over the pilot wires 426, 428 and the pilot selector relay contacts 442, 447 through the control station transmitting switch contacts 404, 414 to the appropriate meter 471 or 473 or 474, this circuit being controlled by contacts 476, 478 or 479 on the control station selector. Thus the metering circuit remains completed in each selected position, except when the pilot wires are taken into use for the performance of some other function, the metering circuit being reestablished when that function has been performed. As mentioned above, the metering circuit is employed in the second selector position for telephone speaking, the only changes in the circuit being the substitution of the two telephone instruments 642, 472 for the metering source and the meter respectively, the circuit being completed through the contacts 595 and 477 on the two selectors.

As has been mentioned, the transmission of a general alarm signal or a telephone calling signal from the substation operates the indicating circuits and apparatus when the selectors are in the general alarm position. In the case of a telephone calling signal, the control station positive coil 460 is energized and closes its contacts 463 to ring the telephone bell 480, this circuit being controlled by selector contacts 475 closed only in the general alarm position, whilst the contacts 462 open to extinguish a green lamp 481. In the case of a general alarm signal the negative coil 465 is energized. The contacts 467 extinguish the green lamp 481 and the contacts 468 energize an auxiliary alarm relay 490, the circuit to which is controlled by the selector contacts 475. This relay 490 makes its own retaining circuit at contacts 491, 492 to render it independent of the indicating contacts and of the selector contacts 475, and breaks the green lamp circuit at contacts 493, whilst the contacts 494 light a red lamp 484 and energize a buzzer 485. The buzzer can be stopped by depressing a stop bell push 483 whose contacts 482 control the retaining circuit to the relay 490. The stop bell push contacts 482 are however bridged by selector contacts 487 open only in the general alarm position, so that depression of the stop bell push 483 cannot interfere with the selecting and indicating cycle. The relay 490 is also provided, in the case when provision is made for obtaining express selection, with further contacts 495 which energize the selecting coil 400 of the transmitting switch and thus initiate an express selecting and indicating cycle, the selecting coil being reenergized after indication in each selected position by the closing of the positive or negative coil contacts 464 or 469. This reenergizing circuit for the selecting coil is also controlled by an express selection device indicated at 486, which can be moved by hand from the position shown into a position in which it short-circuits the auxiliary alarm relay contacts 495 and thus initiates an express selection cycle.

This second arrangement may be modified, if desired, by providing the substation selector with pawl and ratchet actuating mechanism similar to that employed at the control station, as illustrated in Figure 31. Thus the armature $W^1$ of the selector actuating magnet $W^2$ (corresponding to the magnet 570, 571 of Figure 28) directly operates a plate $W^3$ carrying two stops $W^4$ $W^5$ cooperating with a ratchet wheel $W^6$ on the substation selector spindle W and two spring-controlled pawls $W^7$ $W^8$ cooperating with a second ratchet wheel $W^9$ on the spindle W, the arrangement being similar to that already described for the control station mechanism with reference to Figure 29. The contacts $W^{10}$ $W^{11}$ $W^{12}$ $W^{13}$ correspond exactly to the contacts 574, 575, 576, 577 of Figure 28. Thus the energization of the magnet $W^2$ to cause the first half-notch movement and its deenergization to cause the second half-notch movement are brought about in exactly the same manner as that described with reference to Figure 28. The main purposes of performing two separate half-notch movements instead of one full-notch movement at the substation are to isolate the tripping and closing coils of all the circuit-breakers and to prevent stray currents affecting the executive apparatus if the magnet armature fails to return to its normal position.

It will be appreciated that the above two arrangements have been described by way of example only and may be modified in various ways. Thus in both arrangements the control station selector is described as performing two separate half-notch movements, the controlling apparatus remaining locked when the first half-notch movement is made. It is not however essential that the selector itself, whose primary function is to indicate which apparatus has been selected by the substation selector, should have its movements divided into two halves. Thus the selector could be arranged to perform a full-notch movement either when the selecting current is transmitted to the substation or when the release current is received from the control station, provided that the remainder of the controlling apparatus remains locked from the time when a selecting current is transmitted until the release current is received. Such arrangements would however lose the advantage of blanking-off indication during the period in which the substation selector is moving from one position to the next.

It will also be appreciated that the invention is not limited in its application to selective remote control systems for electrical power substations, and that the arrangements described may be modified to suit applications to other remote control purposes.

What we claim as our invention and desire to secure by Letters Patent is:—

1. In an electrical remote control system, the combination of two devices respectively at the controlled end and at the control station to which corresponding step-by-step movements are to be imparted each from one operative position into the next, apparatus at the control station for initiating each movement of the control station device and for transmitting a current for the initiation of the corresponding movement of the device at the controlled end, and means whereby the control station device is caused to perform each movement in two parts which take place respectively when the controlling apparatus is operated and when the device at the controlled end has completed its movement into its new operative position.

2. In an electrical remote control system, the combination of a device at the controlled end to which step-by-step movements are to be imparted each from one operative position to the next, apparatus at the control station for controlling the movements of such device, a device forming part of the controlling apparatus to which step-by-step movements are to be imparted corresponding to those of the device at the controlled end each movement being performed in two parts, means whereby the operation of the controlling apparatus causes its device to perform the first part of its movement and causes a current to be transmitted to the controlled end for the initiation of the movement of the device at that end, means whereby after such current has been transmitted the controlling apparatus is held inoperative with its step-by-step device in the intermediate position, and means for transmitting a release current from the controlled end when the step-by-step device at that end has completed its movement into the new operative position whereby the controlling apparatus is released and its step-by-step device is caused to perform the second part of its movement.

3. In an electrical remote control system, the combination of two rotary step-by-step devices disposed respectively at the control station and at the controlled end, an electromagnet controlling the step-by-step movements of each device, apparatus at the control station for transmitting currents for actuating the electromagnets, means whereby the actuation of the control station electromagnet causes the control station device to make a partial forward movement, means whereby the actuation of the electromagnet at the controlled end causes the device at that end to move forward one step, and means whereby on completion of the movement of the device at the controlled end a current is transmitted to the control station to cause the device at that station to complete its movement.

4. In an electrical selective remote control system for a number of electric switches or other apparatus at an electric substation, the combination of a selector device at the substation step-by-step movements of which cause the successive completion of circuits associated with the individual controlled apparatus, a selection-indicating device at the control station to which corresponding step-by-step movements are imparted, means whereby the movements of the selection-indicating device are utilized to indicate which of the controlled apparatus has been selected, means whereby when a stepped movement is to be initiated the selection-indicating device is caused to make a partial forward movement and a current is transmitted from the control station to the substation, means whereby such current causes the selector device to move forward one step, means whereby after such current has been transmitted the controlling means at the control station remains locked against further operation with the selection-indicating device in its intermediate position, and means whereby the completion of the movement of the selection-indicating device and the release of the controlling means are brought about by a current transmitted from the substation when the selector device has completed its movement.

5. In an electrical selective remote control system for a number of electric switches or other apparatus at an electric substation, the combination of a selector device at the substation to which step-by-step movements are to be imparted, means whereby such movements cause the successive completion of circuits associated with the individual controlled apparatus, a selecting hand-switch at the control station operation of which causes the transmission of current for the actuation of the selector device, at least one further hand-switch at the control station for controlling the transmission of currents for the performance of other operations in the substation, means whereby when current for the actuation of the selector device has been transmitted the controlling hand-switches remain locked against further operation, and means for releasing such hand-switches when the selector device has completed its movement.

6. In an electrical selective remote control system for a number of electric switches or other apparatus at an electric substation, the combination of a selector device at the substation to which step-by-step movements are to be imparted, means whereby such movements cause the successive completion of circuits associated with the individual controlled apparatus, a selection-indicating device at the control station to which corresponding step-by-step movements are imparted, means whereby the movements of the selection-indicating device are utilized to indicate which of the controlled apparatus has been selected, a selecting hand-switch at the control station operation of which causes a selecting current to be transmitted to the substation, means whereby such current causes the selector device to move forward one step, means whereby operation of the selecting hand-switch also causes the selection-indicating device to make a partial forward movement, at least one further hand-switch at the control station for controlling the transmission of currents for the performance of other operations in the substation, means whereby after a selecting current has been transmitted the controlling hand-switches remain locked against further operation with the selection-indicating device in its intermediate position, and means whereby the completion of the movement of the selection-indicating device and the release of the controlling hand-switches are brought about by a current transmitted from the substation when the selector device has completed its movement.

7. The combination with the features set forth in claim 6, of interlocking mechanism between the selection-indicating device and the controlling hand-switches whereby the hand-switches remain locked against operation so long as the selection-indicating device is in its intermediate position.

8. In an electrical remote control system, the combination of a rotary step-by-step device at the controlled end, ratchet and pawl mechanism for imparting the step-by-step movements to the device, an electromagnet for operating such mechanism, means for transmitting currents from the control station for the energization of the electromagnet, a disc carried by the step-by-step device having circumferential recesses corresponding to the stepped positions of the device, a locking bolt cooperating with such recesses whereby the device is locked in each operative position, means operated by the electromagnet when energized for lifting the locking bolt out of the recess in which it is in engagement, means whereby the movement of the locking bolt into engagement in the next recess causes the transmission of a current to the control station, and means whereby such current is utilized to indicate at the control station the completion of the movement of the device into its next position.

9. In an electrical remote control system, the combination of two rotary step-by-step devices disposed respectively at the control station and at the controlled end, apparatus at the control station for transmiting a current for the initiation of each movement of the device at the controlled end, means whereby on completion of such movement a signalling current is transmitted to the control station, a driving electromagnet operative when the controlling apparatus is operated to cause the control station device to make a partial forward movement, and a second electromagnet operative when the signalling current is received to cause the control station device to complete its movement.

10. In an electrical remote control system, the combination of a step-by-step device at the controlled end, a driving electromagnet controlling the movements thereof, a device at the control station to which step-by-step movements are to be imparted corresponding to those of the device at the controlled end each such movement being performed in two parts, a driving electromagnet controlling the first part of the movement of such device, a spring controlling the second part of the movement of such device, a release electromagnet for energizing the spring, means at the control station for transmitting currents for energizing the two driving electromagnets whereby the device at the controlled end performs one complete movement and that at the control station performs the first part of its movement, means whereby the completion of the movement of the device at the controlled end causes the transmission of a release current for energizing the release electromagnet, means whereby the operation of the release electromagnet for energization of the spring causes the deenergization of the two driving electromagnets, means whereby the deenergization of the electromagnet at the controlled end breaks the release current circuit whereupon the release electromagnet is deenergized and the spring causes the control station step-by-step device to perform the second part of its movement.

11. In an electrical selective remote control system for a number of electric switches or other apparatus at an electric substation, the combination of a step-by-step selector device at the substation, means whereby the step-by-step movements of such device cause the successive preparation of circuits associated with the individual controlled apparatus, a selection-indicating device at the control station to which step-by-step movements are imparted corresponding to those of the selector device, a selecting hand-switch at the control station for controlling the transmission of a current for initiating each movement of the selector device and of the selection-indicating device, means whereby the completion of each movement of the selector device causes the transmission of a release current to the control station, a plurality of executive hand-switches at the control station for controlling the transmission of executive currents over the circuits prepared by the selector device in individual selector positions, means whereby an executive current causes the performace of an operation associated with the selected controlled apparatus, means whereby the control station hand-switches are locked against operation after the transmission of each initiating current until the release current is received, and means actuated by the selection-indicating device for locking each executive hand-switch against operation in all selector positions except those appropriate to the performance of the particular executive operation associated with such hand-switch.

12. In an electrical remote control system, the combination of a device at the controlled end to which are to be imparted step-by-step movements each from one operative position to the next, apparatus at the control station for transmitting a current for the initiation of each such movement, means for transmitting a release current to the control station when the device has completed its movement into a new operative position, and means whereby the controlling apparatus is held inoperative after each initiating current has been transmitted until the release current is received, the controlling apparatus including a selecting hand-switch repeated operation of which controls the transmission of currents for causing the successive step-by-step movements of the device, and further hand-operated means associated with the selecting-hand-switch whereby the device can be caused automatically to perform a number of successive step-by-step movements without repeated operation of the selecting hand-switch.

13. In an electrical remote control system, the combination of two devices respectively at the controlled end and at the control station to which corresponding step-by-step movements are to be imparted each from one operative position into the next, means whereby the control station device is prevented from completing each movement until the device at the controlled end has completed the corresponding movement, a selecting hand-switch of the push-button type at the control station for controlling the movements of the devices, means whereby a single depression and release of the selecting push causes the two devices each to perform one stepped movement into a new opeartive position, means whereby an alternative contact-operating movement can be imparted to the selecting push, and means whereby such alternative movement causes the two devices automatically to perform a number of successive step-by-step movements without repeated depression and release of the selecting push.

In testimony whereof we have signed our names to this specification.

BRUCE HAMER LEESON.
OTIS CARTER FORMBY KING.